(12) United States Patent
Kimura et al.

(10) Patent No.: US 7,136,822 B2
(45) Date of Patent: Nov. 14, 2006

(54) INFORMATION PROCESSING METHOD AND SYSTEM FOR RESERVATION

(75) Inventors: Maki Kimura, Aomori (JP); Takashi Yugami, Aomori (JP)

(73) Assignee: Fujitsu Limited, Kawasaki (JP)

( * ) Notice: Subject to any disclaimer, the term of this patent is extended or adjusted under 35 U.S.C. 154(b) by 931 days.

(21) Appl. No.: 10/083,111

(22) Filed: Feb. 27, 2002

(65) Prior Publication Data

US 2003/0097283 A1 May 22, 2003

(30) Foreign Application Priority Data

Nov. 22, 2001 (JP) .............................. 2001-358223

(51) Int. Cl.
*G06Q 10/00* (2006.01)
(52) U.S. Cl. .............................................. 705/5; 705/1
(58) Field of Classification Search ................... 705/5, 705/6, 1
See application file for complete search history.

(56) References Cited

U.S. PATENT DOCUMENTS

| | | | | | |
|---|---|---|---|---|---|
| 6,829,583 | B1 * | 12/2004 | Knapp et al. | ................... | 705/5 |
| 6,876,973 | B1 * | 4/2005 | Visconti | ........................ | 705/5 |

FOREIGN PATENT DOCUMENTS

| | | |
|---|---|---|
| JP | 8-329357 | 12/1996 |
| JP | 09-282394 | 10/1997 |
| JP | 11-242697 | 9/1999 |
| JP | 2000-20832 | 1/2000 |
| JP | 2000-123258 | 4/2000 |
| JP | 2001-265869 | 9/2001 |
| JP | 2001-306714 | 11/2001 |

OTHER PUBLICATIONS

Kimes, Shery E. et al, Developing a Restaurant-management Strategy. Oct. 1999. Cornell Hotel & Restaurant Administration Quarterly, 40, 5, 18.*
Ansel, Daryl et al, A framework for restaurant information technology. Jun. 1999. Cornell Hotel & Restaurant Administration Quarterly, 40, 3, 74 (1).*
Japanese Patent Office Action, dated Aug. 22, 2006.

* cited by examiner

*Primary Examiner*—John W. Hayes
*Assistant Examiner*—Shannon Sallard
(74) *Attorney, Agent, or Firm*—Staas & Halsey LLP

(57) ABSTRACT

An outgo time of first customers in a service providing store such as a restaurant is estimated and is notified to a second customer who made a reservation without time designation. Information relative to a usage amount of money of the first customers in a restaurant is obtained, and an accumulated usage amount of money per customer is calculated. Then, it is judged whether the accumulated usage amount of money per customer exceeds a predetermined reference amount of money. If a second customer makes a reservation for a reservation unit including the seat of the first customers and it is judged that the accumulated usage amount of money of the customer exceeds the predetermined reference amount of money, an outgo time of the first customers, which is obtained by adding a reference time to a time, is notified to the second customer. Thus, the second customer can go to the restaurant in view of the outgo time. The reference amount of money and the reference time are finely set according to a date, the number of persons, and the like.

27 Claims, 24 Drawing Sheets

| KEY | WEEKDAY | | DAY BEFORE HOLIDAY | | END OF YEAR | | HALF-PRICE DAY | | |
|---|---|---|---|---|---|---|---|---|---|
| NO. OF CUSTOMERS | REFERENCE AMOUNT (YEN) | REFERENCE TIME (MIN.) | REFERENCE AMOUNT (YEN) | REFERENCE TIME (MIN.) | REFERENCE AMOUNT (YEN) | REFERENCE TIME (MIN.) | REFERENCE AMOUNT (YEN) | REFERENCE TIME (MIN.) | ... |
| 01 | 3,800 | 25 | 4,500 | 25 | 4,300 | 25 | 2,700 | 30 | |
| 02 | 3,720 | 25 | 4,400 | 25 | 4,200 | 25 | 2,540 | 30 | |
| 03 | 3,650 | 30 | 4,320 | 30 | 4,040 | 30 | 2,500 | 30 | |

503 USAGE STATUS INFORMATION

| | KEY | BASIC SEAT INFO. | | | | | | | | | |
|---|---|---|---|---|---|---|---|---|---|---|---|
| | SEAT NO. | TYPE | CAPACITY | ... | DATE | TYPE | START TIME | NO. OF CUSTOMERS | PURPOSE | ACCUMULATED USAGE AMOUNT | REFERENCE ATTAINMENT TIME | END TIME | ... |
| 1 | 001 | 1 | 04 | | | 2 | | | | | | |
| 2 | 002 | 1 | 04 | | 20010926 | 2 | 1900 | 04 | REUNION PARTY | 00010500 | | |
| 11 | 0011 | 2 | 08 | | | 2 | | | | | | |
| 12 | 0012 | 3 | 01 | | 20010926 | 2 | 1800 | 01 | | 00005230 | 1920 | |

501 502

504 RESERVATION INFORMATION

| | RECEIPT DATE | RECEIPT TIME | NAME | E-MAIL ADDRESS | RESERVED NO. OF PERSONS | MALE | FEMALE | PURPOSE | ACCEPTABILITY OF CHANGE | INVITATION STATUS FLAG | ... |
|---|---|---|---|---|---|---|---|---|---|---|---|
| 1 | | | | | | | | | | | |
| 2 | 20010926 | 1850 | KAZUKO YAMAMOTO | YAMAKAZU@MB. YAMACHAN.CO.JP | 4 | 0 | 4 | REUNION PARTY | | 2 | |
| 11 | | | | | | | | | | | |
| 12 | 20010926 | 1800 | HIROSHI TANAKA | TANAHIRO@BBS. MGSCORP.NE.JP | 4 | 2 | 2 | REUNION PARTY | | 1 | |

FIG. 5

| KEY | | | | | RESERVATION INFORMATION | | | | | |
|---|---|---|---|---|---|---|---|---|---|---|
| SEAT NO. | RECEIPT DATE | RECEIPT TIME | NAME | E-MAIL ADDRESS | RESERVED NO. OF CUSTOMERS | MALE | FEMALE | PURPOSE | ACCEPTABILITY OF CHANGE | INVITATION STATUS FLAG |
| 1 | 004 | 20010926 | 1930 | YOSHIKO ITO | ITOYOSI@CCC.DDDDD.CO.JP | 4 | 2 | 2 | | | 2 |
| 2 | 007 | 20010926 | 1930 | YUKIO ABE | ABEYUKI@AAA.BBBBBB.CO.JP | 6 | 3 | 3 | PARTY | | 2 |
| 3 | 008 | 20010926 | 1930 | KINJI ETO | ETOKIN@INFOYYY.NE.JP | 8 | 0 | 0 | | | 2 |
| 4 | 012 | 20010925 | 1920 | KOUJI UEYAMA | UEKOU@INFOXXX.NE.JP | 1 | 1 | 0 | | | 2 |
| 5 | | | | | | | | | | | |

FIG. 6

RESTAURANT NAME : BAR UZURA                SEAT STATUS SCREEN                2001/09/26 19:30

| TABLE NO. 711 | TABLE TYPE 712 | VACANCY 713 | PURPOSE AND USER INFORMATION 714 | ARRIVAL TIME 715 | PROGRESS STATUS 716 | STATUS OF NEXT RESERVATION 717 | STATUS 718 |
|---|---|---|---|---|---|---|---|
| 1 | 4-PERSON TABLE | VACANT | — | — | □□□□ | | RESERVATION |
| 2 | 4-PERSON TABLE | OCCUPIED | REUNION PARTY (ONLY WOMAN) | 19:00 | □□■■ | | RESERVATION |
| 3 | 4-PERSON TABLE | VACANT | — | — | □□□□ | | RESERVATION |
| 4 | 4-PERSON TABLE | OCCUPIED | REUNION PARTY (MIXED) | 18:30 | □□■■ | | RESERVATION |
| 5 | 6-PERSON TABLE | VACANT | — | — | □□□□ | | RESERVATION |
| 6 | 6-PERSON TABLE | OCCUPIED | WELCOME PARTY (MIXED) | 18:30 | □□■■ | | RESERVATION |
| 7 | 6-PERSON TABLE | VACANT | — | — | □□□□ | | RESERVATION |
| 8 | 8-PERSON TABLE | OCCUPIED | WELCOME PARTY (MIXED) | 18:00 | □■■■ | RESERVED | RESERVATION |
| 9 | 8-PERSON TABLE | VACANT | — | — | □□□□ | | RESERVATION |
| 10 | 8-PERSON TABLE | OCCUPIED | FAREWELL PARTY (ONLY MEN) | 19:00 | □□■■ | | RESERVATION |
| 11 | 8-PERSON TABLE | VACANT | — | — | □□□□ | | RESERVATION |
| 12 | COUNTER | OCCUPIED | — | 18:00 | ■■■■ | RESERVED | RESERVATION |
| 13 | COUNTER | OCCUPIED | — | 18:00 | □■■■ | | RESERVATION |

LAYOUT WITHIN RESTAURANT 701

FIG. 7

| | | 2001/09/26 19:30 |
|---|---|---|
| | RESERVATION SCREEN | |
| 801 | RESTAURANT NAME | BAR UZURA |
| 802 | TABLE NO. | 7 |
| 803 | TABLE TYPE | 6-PERSON TABLE |
| 804 | VACANT OR OCCUPIED | VACANT |
| 805 | NAME | YUKIO ABE |
| 806 | E-MAIL ADDRESS | ABEYUKI@AAA.BBBBBBB.CO.JP |
| 807 | NO. OF PERSONS FOR RESERVATION | 6 PERSONS (INCLUDES: 3 MALES, 3 FEMALES) |
| 808 | PURPOSE | PARTY ▶ ◁ ▷ WELCOME PARTY PARTY FAREWELL PARTY REUNION PARTY NOT SPECIFIED |

810

[RESERVE] — 809

| | | 2001/09/26 19:30 |
|---|---|---|
| | PROVISIONAL RESERVATION SCREEN | |
| 901 | RESTAURANT NAME | BAR UZURA |
| 902 | TABLE NO. | 4 |
| 903 | TABLE TYPE | 4-PERSON TABLE |
| 904 | VACANT OR OCCUPIED | OCCUPIED |
| 905 | NAME | YOSHIKO ITO |
| 906 | E-MAIL ADDRESS | ITOYOSI@CCC.DDDDDD.CO.JP |
| 907 | NO. OF PERSONS FOR RESERVATION | 4 PERSONS (INCLUDES: 2 MALES, 2 FEMALES) |
| 908 | PURPOSE | NOT SPECIFIED ▼ |
| 909 | CHANGE TO ANOTHER TABLE | 2 (1: ACCEPTABLE, 2: UNACCEPTABLE) |

910 — PROVISIONALLY RESERVE

FOLLOWING RESERVATION WAS ACCEPTED.
PLEASE COME TO OUR RESTAURANT BY 19:50.

| | | |
|---|---|---|
| 1001 | RESTAURANT NAME | BAR UZURA |
| 1002 | TABLE NO. | 7 |
| 1003 | TABLE TYPE | 6-PERSON TABLE |
| 1004 | VACANT OR OCCUPIED | VACANT |
| 1005 | NAME | YUKIO ABE |
| 1006 | E-MAIL ADDRESS | ABEYUKI@AAA.BBBBBB.CO.JP |
| 1007 | RESERVED NO. OF PERSONS | 6 PERSONS (INCLUDES: 3 MALES, 3 FEMALES) |
| 1008 | PURPOSE | PARTY |

FOLLOWING PROVISIONAL RESERVATION WAS ACCEPTED.
WE WILL INFORM YOU OF TIMING TO VISIT OUR RESTAURANT
BY E-MAIL, SO PLEASE WAIT FOR A WHILE.

| | | |
|---|---|---|
| 1100 | RESTAURANT NAME | BAR UZURA |
| 1101 | TABLE NO. | 4 |
| 1102 | TABLE TYPE | 4-PERSON TABLE |
| 1103 | VACANT OR OCCUPIED | OCCUPIED |
| 1104 | NAME | YOSHIKO ITO |
| 1105 | E-MAIL ADDRESS | ITOYOSI@CCC.DDDDDD.CO.JP |
| 1106 | RESERVED NO. OF PERSONS | 4 PERSONS (INCLUDES: 2 MALES, 2 FEMALES) |
| 1107 | PURPOSE | PARTY |
| 1108 | CHANGE TO ANOTHER TABLE | 2 (1: ACCEPTABLE, 2: UNACCEPTABLE) |

| | | | USAGE STATUS INFORMATION | | | | |
|---|---|---|---|---|---|---|---|
| KEY | | | | | | | |
| SEAT NO. | DATE | START TIME | NO. OF CUSTOMERS | PURPOSE | ACCUMULATED USAGE AMOUNT | REFERENCE ATTAINMENT TIME | END TIME | .. |
| 1 | 001 | 20010926 | 1730 | 03 | | 00013400 | 1905 | 1920 |
| 2 | 002 | 20010926 | 1700 | 04 | | 00006540 | | 1750 |
| 3 | 002 | 20010926 | 1800 | 04 | | 00014920 | 1835 | 1855 |
| 4 | 005 | 20010926 | 1740 | 05 | PARTY | 00019850 | | 1920 |
| 5 | 011 | 20010926 | 1750 | 08 | WELCOME PARTY | 00026630 | | 1925 |

1502

1503

RESERVATION INFO.

| | RECEIPT DATE | RECEIPT TIME | NAME | E-MAIL ADDRESS | RESERVED NO. OF PERSONS | MALE | FEMALE | PURPOSE | ACCEPTABILITY OF CHANGE | .. |
|---|---|---|---|---|---|---|---|---|---|---|
| 1 | | | | | | | | | | |
| 2 | | | | | | | | | | |
| 3 | | | | | | | | | | |
| 4 | 20010926 | 1730 | ICHIRO OGAWA | OGAWA@INFOXXX.NE.JP | 6 | | | PARTY | 2 | |
| 5 | 20010926 | 1740 | KAORU KAWAMURA | KAIRI@GROUP.COM | 8 | 5 | 3 | REUNION PARTY | 2 | |

TO: YOSHIKO ITO
FROM: BAR UZURA
TIME: 2001/09/26, 20:10:36
SUB: INFORMATION ABOUT YOUR VISIT

DEAR: MS. YOSHIKO ITO

PLEASE COME TO OUR RESTAURANT AT 20:30.

BAR UZURA

RESTAURANT MONITOR — 1901

| NO. | CAPACITY | VACANCY | PURPOSE | ARRIVAL TIME | PROGRESS STATUS | NEXT RESERVATION |
|---|---|---|---|---|---|---|
| 1 | 4 | VACANT | — | — | ☐☐☐☐ | |
| 2 | 4 | OCCUPIED | REUNION PARTY (ONLY WOMAN) | 19:00 | ☐■☐☐ | |
| 3 | 4 | VACANT | — | — | ☐☐☐☐ | |
| 4 | 4 | OCCUPIED | REUNION PARTY (MIXED) | 18:30 | ☐☐■☐ | |
| 5 | 6 | VACANT | — | — | ☐☐☐☐ | |
| 6 | 6 | OCCUPIED | WELCOME PARTY (MIXED) | 18:30 | ☐☐■☐ | |
| 7 | 6 | VACANT | — | — | ☐☐☐☐ | |
| 8 | 8 | OCCUPIED | WELCOME PARTY (MIXED) | 18:00 | ☐☐■☐ | RESERVATION |
| 9 | 8 | VACANT | — | — | ☐☐☐☐ | |
| 10 | 8 | OCCUPIED | FAREWELL PARTY (ONLY MEN) | 19:00 | ☐☐☐☐ | |
| 11 | 8 | VACANT | — | — | ☐☐☐☐ | |
| 12 | 1 | OCCUPIED | — | 18:00 | ■■■■ | RESERVATION |
| 13 | 1 | OCCUPIED | — | 18:00 | ■■■☐ | |

2001/09/26 19:30

1902

| RESPONSE | TIME | NO. | STATUS / INSTRUCTION |
|---|---|---|---|
| ○ | 1700 | 2 | ARRIVED |
| ○ | 1800 | 8 | ARRIVED |
| ○ | 1800 | 12 | ARRIVED |
| ○ | 1800 | 13 | ARRIVED |
| ○ | 1810 | 2 | PROVISIONAL RESERVATION RECEIVED |
| ○ | 1830 | 6 | ARRIVED |
| ○ | 1830 | 4 | ARRIVED |
| ○ | 1840 | 2 | CONFIRMATION OF RESERVATION SENT |
| ○ | 1850 | 2 | LEFT |
| ○ | 1850 | 2 | MAKE SEAT RESERVED |
| ○ | 1900 | 10 | ARRIVED |
| ○ | 1900 | 2 | ARRIVED |
| △ | 1930 | 7 | RESERVATION RECEIVED |
| ○ | 1930 | 4 | PROVISIONAL RESERVATION RECEIVED |

1903  1904  1905  1906

[ 1930  7  MAKE SEAT RESERVED ] — 1907

[ DONE ]

|  | STATE | | | | | |
|---|---|---|---|---|---|---|
|  | 1 | 2 | 3 | 4 | 5 | 6 |
| SEAT MASTER FILE | | | | | | |
|   SEAT NO. | 4 | 4 | 4 | 4 | 4 | 4 |
|   : | | | | | | |
|   DATE | | 26 | 26 | 26 | | 26 |
|   START TIME | | 1830 | 1830 | 1830 | | 2020 |
|   NO. OF PERSONS | | 4 | 4 | 4 | | 4 |
|   ACCUMULATED USAGE AMOUNT | | 500 | 13420 | 18140 | | 350 |
|   REFERENCE ATTAINMENT TIME | | | | 1950 | | |
|   END TIME | | | | | | |
|   : | | | | | | |
|   RECEIPT DATE | | 26 | 26 | 26 | | 26 |
|   RECEIPT TIME | | 1820 | 1820 | 1820 | | 1930 |
|   NAME | | KINOSHITA | KINOSHITA | KINOSHITA | | ITO |
|   : | | | | | | |
| RESERVATION MASTER | | | | | | |
|   SEAT NO. | 4 | | 4 | 4 | 4 | |
|   RECEIPT DATE | 26 | | 26 | 26 | 26 | |
|   RECEIPT TIME | 1820 | | 1930 | 1930 | 1930 | |
|   NAME | KINOSHITA | | ITO | ITO | ITO | |
|   : | | | | | | |
| USAGE HISTORY FILE | | | | | | |
|   SEAT NO. | | | | | 4 | |
|   DATE | | | | | 26 | |
|   START TIME | | | | | 1830 | |
|   ACCUMULATED USAGE AMOUNT | | | | | 18820 | |
|   REFERENCE ATTAINMENT TIME | | | | | 1950 | |
|   END TIME | | | | | 2015 | |
|   : | | | | | | |
|   RECEIPT DATE | | | | | 26 | |
|   RECEIPT TIME | | | | | 1820 | |
|   NAME | | | | | KINOSHITA | |
|   : | | | | | | |

FIG.22

INFORMATION PROCESSING METHOD AND SYSTEM FOR RESERVATION

TECHNICAL FIELD OF THE INVENTION

The present invention relates to an information processing technique relative to a reservation at a service providing store such as a restaurant.

BACKGROUND OF THE INVENTION

A restaurant (hereinafter, including a pub or the like) generally accepts reservations in advance to secure customers. That is, a customer previously notifies the restaurant of reservation conditions relative to the use date, the number of persons, the contents of a dish and the like by the use of communication means such as the telephone or the Internet, and the result of the reservation is decided by whether the restaurant accepts the reservation. At that time, the restaurant sets a usage time limitation on the reservation, so that a plurality of reservations can be accepted without temporal overlap for a seat or a table (hereinafter, the "seat" is used in the case where a reservation unit is indicated). On the other hand, customers do not always come to the restaurant after making reservations, but they often come to the restaurant directly without reservations. In that case, when there is a vacant seat, the restaurant can guide the customer to the vacant seat, however, in the case of full house or even if there is a vacant seat, when the seat is a reserved seat, the restaurant declines entrance. Incidentally, the use time limitation is not usually imposed on the customers who directly come to the restaurant.

As stated above, for the restaurant or the like, the usage time of the customers who directly come to the restaurant is not necessarily clear, and it is often unclear when they go out of the restaurant, and therefore, there has been a problem that even if there is a customer who wishes to make a reservation thereafter, the restaurant can not accept the reservation. However, the customer presently taking the seat may go out of the restaurant soon. In the case where the customer actually goes out of the restaurant soon, a great loss of business chance occurs for the restaurant. Besides, for example, when there suddenly occurs such a state that a restaurant reservation must be made, although a restaurant having a vacant seat may be found immediately, there is also a case where a restaurant having a suitable vacant seat can not be found. If a restaurant outgo time (hereinafter simply called "outgo time") when the customer presently taking the seat goes out the restaurant can be estimated, the restaurant can deal with sudden reservations, and business efficiency is improved, and a feeling of satisfaction of a customer who attempts to make a reservation is also improved.

SUMMARY OF THE INVENTION

Therefore, an object of the present invention is to provide a technique for estimating an outgo time of a customer in a service providing store such as a restaurant.

Another object of the present invention is to provide a technique for effectively dealing with reservations in a service providing store such as a restaurant.

Still another object of the present invention is to provide a technique for enabling a reservation without time designation in a service providing store such as a restaurant.

An information processing method according to a first aspect of the present invention comprises steps of: obtaining information concerning a usage amount of money of a customer in a store, calculating and storing into a storage device, an accumulated usage amount of money of the customer (for example, an accumulated usage amount of money per customer); comparing the accumulated usage amount of money of the customer with a predetermined reference amount of money relative to the accumulated usage amount of money; and estimating an outgo time of the customer on the basis of at least a comparison result of the comparing step. As stated above, the outgo time of the customer from a restaurant is estimated by using the accumulated usage amount of money of the customer.

Besides, the aforementioned comparing step may comprise a step of judging whether or not the accumulated usage amount of money of the customer exceeds the predetermined reference amount of money. For example, the outgo time is estimated on the basis of whether or not the accumulated usage amount of money of the customer exceeds the predetermined reference amount of money.

Further, the first aspect of the present invention may further comprise a step of, in a case where a second customer makes a reservation for a reservation unit including the seat of the first customer and it is judged that the accumulated usage amount of money of the first customer exceeds the predetermined reference amount of money, notifying the second customer of the estimated outgo time of the first customer. With this configuration, the second customer can get a rough idea of the time of going to the store.

A reservation method according to a second aspect of the present invention may comprise steps of: transmitting to a server, registration information of a reservation without time designation for a reservation unit which is already used by another customer in a store; and a step of receiving from the server, information including an estimated outgo time of the aforementioned another customer, which is generated in a case where a usage amount of money of the aforementioned another customer using the reservation unit in the store satisfies a predetermined condition.

As stated above, also with respect to the reservation unit, which is already used by another customer, the reservation without time designation can be made, and the notification of the estimated outgo time can be obtained, whereby the convenience of a customer who needs to make an urgent reservation is remarkably raised.

Incidentally, the foregoing information processing method can also be carried out by installing a dedicated program into computer hardware and by causing the program to be executed. In this case, this program is stored in a storage medium or a storage device, for example, a flexible disk, a CD-ROM, a magneto-optical disk, a semiconductor memory, or a hard disk. Besides, there is also a case where the program is distributed through a network or the like. Incidentally, intermediate processing results are temporarily stored in a memory.

BRIEF DESCRIPTION OF THE DRAWINGS

FIG. 2 is a diagram showing an example of a reference amount table;

FIG. 5 is a diagram showing an example of a seat master file;

FIG. 6 is a diagram showing an example of a reservation master file;

FIG. 7 is a diagram showing a screen example for indicating seat status;

FIG. 8 is a diagram showing an example of a reservation screen;

FIG. 9 is a diagram showing an example of a provisional reservation screen;

FIG. 10 is a diagram showing an example of a reservation confirmation screen;

FIG. 11 is a diagram showing an example of a provisional reservation screen;

FIG. 15 is a diagram showing an example of a usage history file;

FIG. 17 is an example of an e-mail for invitation to a restaurant;

FIG. 19 is a diagram showing an example of a screen displayed on a system monitor;

FIG. 22 is a diagram showing data transition;

DETAIL DESCRIPTION OF THE PREFERRED EMBODIMENTS

Figure 1:
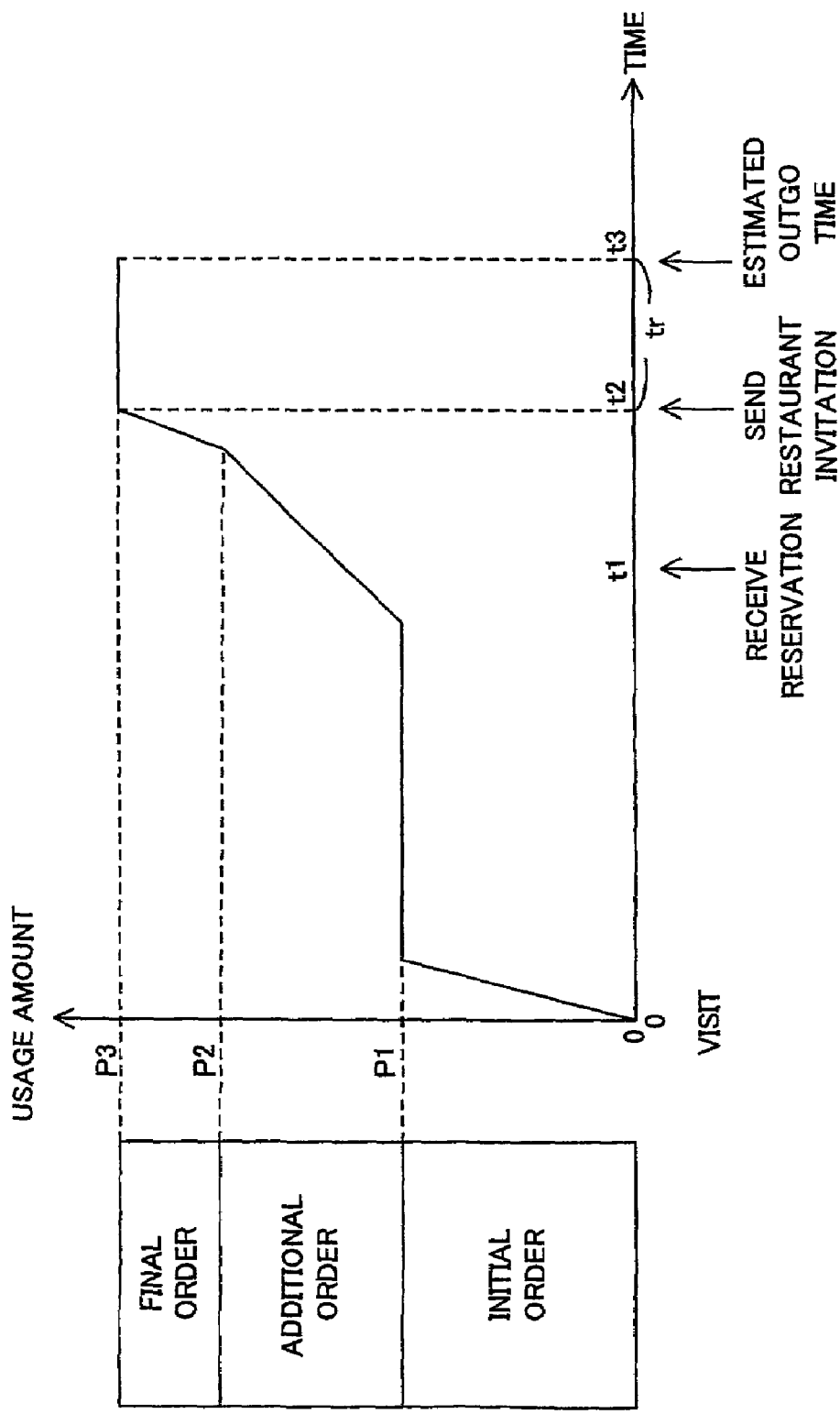
FIG. 1 is a diagram for explaining the principle of the present invention.

First, the principle of an embodiment of the present invention will be described with reference to FIGS. 1 and 2. FIG. 1 is a graph showing a change of an accumulated usage amount of money (accumulated order sum of money) since the time when a first customer came in a restaurant. The vertical axis indicates the accumulated usage amount of money per person and the horizontal axis indicates the time.

When the first customer comes in the restaurant, he or she gives an initial order as a first order. Then the accumulated usage amount of money per person becomes P1. Next, when an additional order is given, the accumulated usage amount of money per person becomes P2. At a time t1 while the additional order is given, a restaurant reservation system of this embodiment receives a reservation from another second customer. Since this reservation is a reservation for the reservation unit (in this case, "seat") used by the first customer, in this embodiment, it is treated as a provisional reservation. Thereafter, the first customer gives the final order for the first customer, and it is assumed that the accumulated usage amount of money per person reaches a reference amount of money P3 at a time t2. The reference amount of money is an accumulated usage amount of money per person used by the time that many customers go out of the restaurant, and for example, an average usage amount of money per person relative to all customers. However, there is also a case where not an average, but another statistic is used.

Then, the restaurant reservation system estimates an outgo time t3 when the first customer goes out of the restaurant. In this embodiment, a reference time tr from a point of time when the accumulated usage amount of money per customer reaches the reference amount of money to a point of time when the customer goes out of the restaurant is regulated correspondingly to the reference amount of money. The reference time tr is a time from a point of time when many customers give the final order (more strictly, from the point of time when the accumulated usage amount of money per person exceeds the reference amount of money) to a point of time when they go out of the restaurant, and for example, it is an average time from the point of time when the accumulated usage amount of money per person reaches the reference amount of money to the point of time when they go out of the restaurant. However, there is also a case where not an average, but another statistic is used. Accordingly, the estimated outgo time t3 of the first customer is calculated by the time t2+the reference time tr. Then, the restaurant reservation system transmits a restaurant invitation including the information of the estimated outgo time t3 to the second customer via, for example, e-mail. The second customer receiving the restaurant invitation takes the estimated outgo time t3 into consideration and goes to the restaurant, and if the first customer has already gone out of the restaurant, he or she is allowed to use the reservation unit.

The reference amount of money and the reference time are very important numerical values in estimating the outgo time, and are different according to at least the number of customers, the category of a date (for example, a day of the week, a week day or a holiday, the end of the year or the beginning of the year, Christmas season, farewell and welcome party season, etc.). Accordingly, in this embodiment, they are held in, for example, a reference amount table as shown in FIG. 2. In the example of FIG. 2, there are provided, a column 201 for the number of customers as a key, a column 202 for a week day, a column 203 for a day before a holiday, a column 204 for the end of the year, and a column 205 for a half-price day. There is also a case where the classification other than these is added. A column for a reference amount of money (yen) and a column for a reference time (minute) are provided in each of the column 202 for the week day, the column 203 for the day before the holiday, the column 204 for the end of the year, and the column 205 for the half-price day. Accordingly, the restaurant reservation system judges the number of the first customers and the kind of the day, acquires the information of the reference amount of money and the reference time of that day, and estimates the outgo time of the first customers. By finely setting the reference amount of money and the reference time in this way, it becomes possible to more accurately estimate the outgo time.

Figure 3:
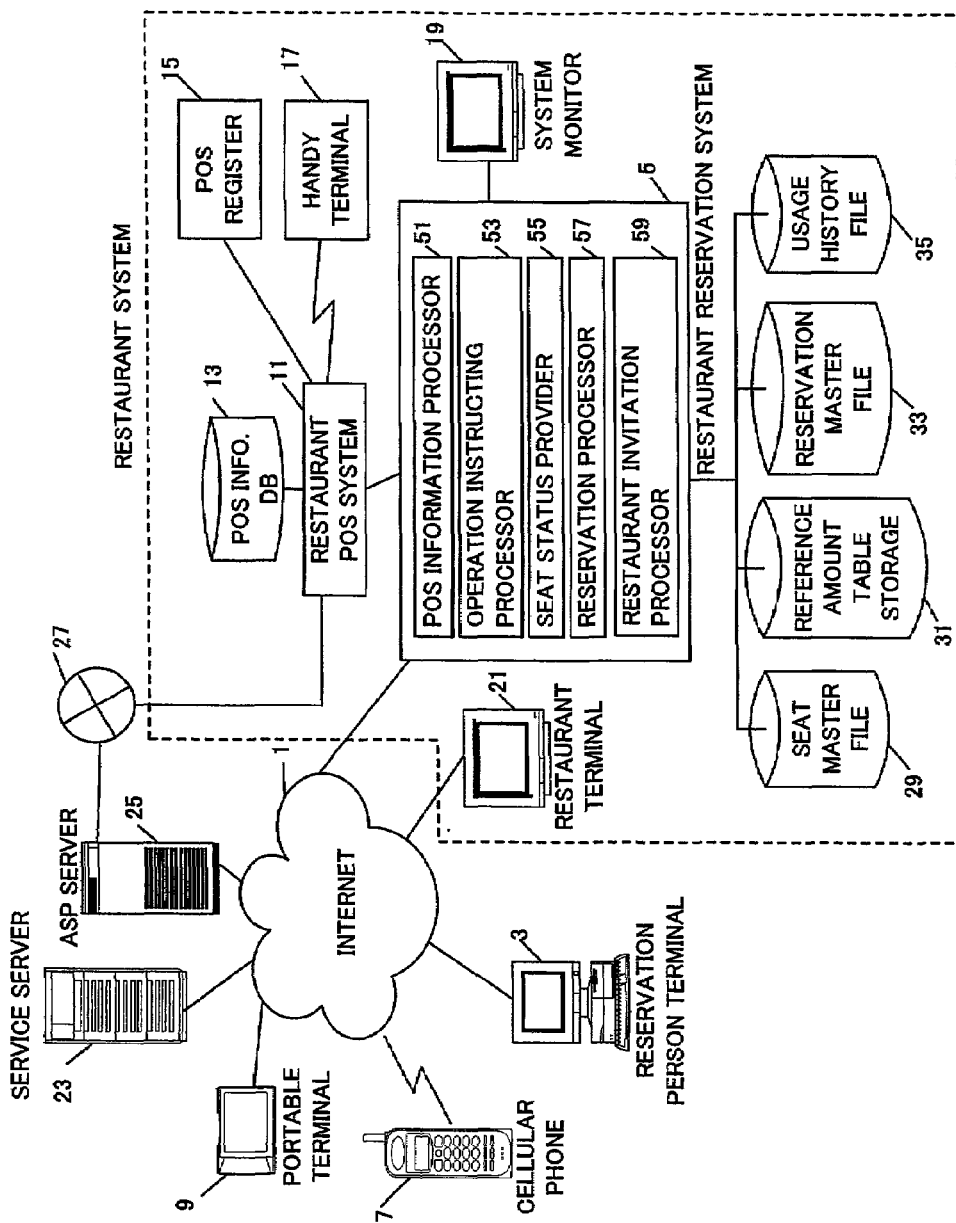
FIG. 3 is a diagram showing the outline of a system according to an embodiment of the present invention.

FIG. 3 shows the outline of a system for realizing the principle of this embodiment as explained in FIGS. 1 and 2. The internet 1 as a computer network is connected with a reservation person terminal 3 which is a personal computer, for example, and is operated by a reservation person, a cellular phone 7 operated by a reservation person, a portable terminal 9 operated by a reservation person, a service server 23, an ASP (Application Service Provider) server 25, a restaurant reservation system 5 operated by a restaurant, and a restaurant terminal 21 installed in the restaurant. A reservation person may use any of the reservation person terminal 3, the cellular phone 7 and the portable terminal 9. These terminals have a web browser function, and have at least a mailer function for receiving mail.

Although the service server 23 is not indispensable in this embodiment, for example, there is also a case where a plurality of restaurants are registered in the service server 23, a reservation person searches, for example, a desired restaurant through a search function provided by the service server 23 and accesses, for example, the restaurant reservation system 5 of the desired restaurant. Similarly, the ASP server 25 is not indispensable in this embodiment. But, it is a server for realizing the functions of the restaurant reservation system 5 of this embodiment on the basis of information from the restaurant, and similarly to the service server 23, there is also a case where the search of a plurality of restaurants are enabled. There is also a case where the ASP server 25 is connected to a restaurant POS system 11 through, for example, a public network 27.

The restaurant reservation system 5 is a system for executing the main processing of this embodiment, and includes a POS (Point Of Sales) information processor 51, an operation instructing processor 53, a seat status provider 55, a reservation processor 57, and a restaurant invitation processor 59. The functions of these will be described later, together with the processing flow. The restaurant reservation system 5 is connected to the restaurant POS system 11. The restaurant POS system 11 is connected with a POS information DB 13, one or plural POS registers 15 used for customer's payment of an order amount of money or the like, and one or plural handy terminals 17 held by waiter or waitress and for inputting orders of customers. The restaurant POS system 11 outputs information registered in the POS information DB 13 in response to a request from the POS information processor 51 of the restaurant reservation system 5. On the other hand, the restaurant POS system 11 has such a function that each time new POS information is inputted from the POS register 15 or the handy terminal 17, it registers the POS information in the POS information DB 13, and transmits the POS information to the POS information processor 51 of the restaurant reservation system 5. Besides, there is also a case where the restaurant POS system 11 includes a system for requesting a kitchen of the restaurant to prepare ordered dishes.

The restaurant reservation system 5 is connected with a system monitor 19 for displaying information and instructions relative to reservations to the waiter or waitress of the restaurant. However, there is also a case where for example, the POS register 15 is substituted for it. Besides, the restaurant reservation system 5 controls a seat master file 29, a reference amount table storage 31 for holding a reference amount table as shown in FIG. 2, a reservation master file 33, and a usage history file 35. These will be described in detail, together with the processing flow.

For example, in a restaurant or the like, there is also a case where the restaurant terminal 21 is installed in each of tables. There is also a case where the restaurant terminal 21 has, for example, a function of giving an order, or a function of enabling divination or information provision. In this embodiment, the restaurant terminal 21 has a function of connecting with the Internet 1, and is used in such a manner that a customer accesses the service server 23 to search a next restaurant and to make reservations. Besides, in the case where the ASP server 25 is used, there is also a case where the restaurant reservation system 5 is not provided in the restaurant. In that case, there is also a case where the restaurant terminal 21 functions as the system monitor 19 for displaying information and instructions relative to reservations to the waiter or waitress of the restaurant.

Next, the operation of the system shown in FIG. 3 will be described with reference to FIGS. 4 to 22. First, the processing of a scene in which a reservation person makes a reservation will be described with reference to FIGS. 4 to 11. The reservation person accesses a seat status Web page of the restaurant reservation system 5 by using, for example, the reservation person terminal 3 (step S1). The seat status provider 55 of the restaurant reservation system 5 responds to the access from the reservation person terminal 3, and generates web page data for the seat status by referring to the seat master file 29, the reservation master file 33, and the reference amount table storage 31 (step S3).

FIG. 5 shows an example of the seat master file 29. The seat master file 29 shown in FIG. 5 includes a column 501 for a seat number as a key, a column 502 for basic seat information including seat type (1: table, 2: room, 3: counter), seating capacity, and the like, a column 503 of usage status information including a date, a type (1: week day, 2: before holiday, 3: year end), a start time as a time of order start, the number of customers, usage purpose of the restaurant, accumulated usage amount of money, a reference attainment time as a time when the accumulated usage amount of money reaches a reference amount of money, a completion time as an outgo time, etc., and a column 504 for reservation information including a reservation receipt date, a reservation receipt time, a name of a reservation person, an e-mail address, the number of persons for reservation, the number of males and females, a usage purpose of the restaurant, information relative to acceptability of a change to another seat (1: change acceptable, 2: change unacceptable), and a restaurant invitation status flag indicating whether or not a restaurant invitation mail is already sent. Records of seats that can be reserved are provided in the seat master file 29. If there is no customer seated, any data are not stored in the column 503 for the usage status information and the column 504 of the reservation information. In the example of FIG. 5, seat numbers 001 and 011 indicate that the seats are vacant. In the case where a customer comes to the restaurant without reservations and takes a seat, data is not stored in the column 504 for the reservation information. In the example of FIG. 5, seats of seat numbers 002 and 012 are used at present by customers who made reservations and came to the restaurant.

FIG. 6 shows an example of the reservation master file 33. The reservation master file 33 includes a column 601 for a seat number as a key and a column 602 for reservation information. Similarly to the data stored in the column 504 for the reservation information of the seat master file 29, the reservation information of the column 602 includes a reservation receipt date, a reservation receipt time, a name of a reservation person, an e-mail address, the number of persons for reservation, the number of males and females, a usage purpose of the restaurant, information relative to acceptability of a change to another seat (1: change acceptable, 2: change unacceptable), and a restaurant invitation status flag indicating whether or not a restaurant invitation mail is already sent.

The seat status provider 55 of the restaurant reservation system 5 reads out the information of the seat master file 29, and judges whether reservations of the respective seats are registered in the reservation master file 33. Besides, for each of the seats, a reference amount of money is read out from the reference amount table storage 31 on the basis of the number of customers and the type information indicating a week day, a day before holiday, the year end, etc. Further, the accumulated usage amount of money stored in the column 503 for the usage status information of the seat master file 29 is read out, the accumulated usage amount of money per person is calculated, and a ratio of the accumulated usage amount of money per person to the read reference amount of money is calculated. There is also a case where image data of a seat layout of this restaurant is read out from another storage device. The seat status provider 55 generates web page data for the seat status from the information. Then, the seat status provider 55 transmits the web page data for the seat status to the reservation person terminal 3 (step S5). The reservation person terminal 3 receives the web page data for the seat status from the restaurant reservation system 5, and displays it on the display device (step S7).

FIG. 7 shows an example of the Web page for the seat status. FIG. 7 shows an example of a restaurant with a restaurant name of "Bar Uzura". A layout 701 within the restaurant is included, for example, as an image picture at the left of the screen. A seat status list 703 is provided at the right of the screen. The seat status list 703 includes a column 711 for a table number (No.), a column 712 for a table type, a column 713 indicating whether or not a seat is vacant, a column 714 for a usage purpose and user information, a column 715 for an arrival time, a column 716 for a progress status indicating a ratio of an accumulated usage amount of money per person to the reference amount of money by the use of the number of blocks, a column 717 for indicating whether or not there is a next reservation, and a column 718 of a reservation button. The table (seat) number, the table (seat) form, whether or not the seat is vacant, the usage purpose and user information, and the arrival time are formed of data from the seat master file 29. The progress status is based on the calculation result of the ratio of the accumulated usage amount of money per person to the reference amount of money. Incidentally, with respect to the progress status, although the example of using the ratio of the accumulated usage amount of money per person to the reference amount of money has been given, for example, a progress status simply obtained by calculation of a present usage time to an average usage time may be displayed. Besides, the configuration may be such that a display based on the usage time is carried out until an estimation of an outgo time is obtained on the basis of the reference amount of money and the reference time, and when the estimation is obtained, a display on the basis of the estimation is carried out. Besides, the judgment whether or not there is a next reservation is based on whether or not reservation information is included in the reservation master file 33.

A reservation person confirms the layout of the seats through the display of the layout within the restaurant, and judges whether or not a desired seat is vacant, and in the case where the seat is occupied, the reservation person checks the data of the progress status and judged whether the former customer are likely to go out of the restaurant, and the like, and can make a reservation or a provisional reservation.

The reservation person operating the reservation person terminal 3 watches the screen as shown in FIG. 7, and when determining to make a reservation, the person clicks the reservation button of a desired seat. By doing so, the reservation person terminal 3 receives reservation instructions due to clicking of the reservation button, and transmits the reservation instructions including the seat number (more generally, seat identification information) relative to the reservation instructions to the restaurant reservation system 5 (step S9). When receiving the reservation instructions including the seat number from the reservation person terminal 3, the reservation processor 57 of the restaurant reservation system 5 refers to the seat master file 29 to judge whether the seat of the seat number is vacant at present. If the seat is vacant, web page data for the reservation registration is generated, and if the seat is occupied, web page data for the provisional reservation registration is generated, and the data are transmitted to the reservation person terminal 3 (step S11). The reservation person terminal 3 receives the web page data for the provisional reservation or reservation registration from the restaurant reservation system 5, and displays it on the display device (step S13).

FIG. 8 shows an example of the web page for the reservation registration. In the example of FIG. 8, there are provided a column 801 for a store name, a column 802 for a table number, a column 803 for a table type, a column 804 for indicating vacant or occupied, an input column 805 for a name, an input column 806 for an e-mail address, an input column 807 for the number of persons for reservation, an input column 808 for a usage purpose, and a reservation button 809. The restaurant name, the table, the table type, and the vacant seat information representing vacant or occupied are generated from the information of the seat master file 29. The input of the name is indispensable. In the case where the seat is vacant at present and a reservation is made, since the restaurant invitation mail is not sent from the restaurant reservation system 5, the input of the e-mail address is not indispensable. Although the input of the number of persons for reservation is indispensable, it is not necessary to input the details. The usage purpose is selected from alternatives 810 in a combo box. The contents of the alternatives are not limited to the contents shown in FIG. 8. Incidentally, in the case where an input is not desired, it is also possible to make such a selection as not to designate.

FIG. 9 shows an example of the web page for the provisional reservation registration. In the example of FIG. 9, there are provided a column 901 for a restaurant name, a column 902 for a table number, a column 903 for a table type, a column 904 for representing vacant or occupied, an input column 905 for a name, an input column 906 for an e-mail address, an input column 907 for the number of persons for reservation, an input column 908 for a usage purpose, an input column 909 for representing acceptability of a change to another table (1: change acceptable, 2: change unacceptable), and a provisional reservation button 910. The store name, the table, the table type, and the vacant seat information for representing vacant or occupied are generated from the information of the seat master file 29. The input of a name is indispensable. In the case of the provisional reservation, since a restaurant invitation mail is sent from the restaurant reservation system 5, the input of an e-mail address is indispensable. Although the input of the number of persons for reservation is indispensable, it is not necessary to input the details. The usage purpose is selected from the alternatives of the combo box. Although the contents of the alternatives may be the same as the contents of FIG. 8, they are not limited to this. Incidentally, in the case where an input is not desired, it is also possible to make such a selection as not to specify. Besides, If setting is made such that a change to another table is acceptable, in the case where the estimated outgoing time is not right, or in the case where another seat becomes vacant, the other table is assigned, and the service can be provided from the restaurant.

The reservation person inputs necessary reservation information into the Web page for the reservation registration and the Web page for the provisional reservation registration, and clicks the reservation button 809 or the provisional reservation button 910. On the other hand, the reservation person terminal 3 receives the input of the reservation information from the reservation person (step S15), receives the reservation or provisional reservation registration instruction, and transmits the reservation registration instruction or the provisional reservation registration instruction, together with the reservation information, to the restaurant reservation system 5 (step S17). The reservation processor 57 of the restaurant reservation system 5 receives the reservation registration instruction or the provisional reservation registration instruction including the reservation information from the reservation person terminal 3, and registers the reservation information in the reservation master file 33 (step S19).

Then, the reservation processor 57 generates the Web page data for the reservation or provisional reservation receipt (step S21), and transmits the Web page data for the reservation or provisional reservation receipt to the reservation person terminal 3 (step S23). The reservation person terminal 3 receives the Web page data for the reservation or provisional reservation receipt from the restaurant reservation system 5, and displays it on the display device (step S25).

FIG. 10 shows an example of the Web page for reservation receipt. In the case of reservations, since the seat is already in a vacant state, the customer is asked to come to the restaurant in, for example, 20 minutes (here, 19:50). In the case where the reservation information registered in the reservation master file 33 is not moved to the seat master file 29 in, for example, 30 minutes though the record as to the same seat number is not recorded in the seat master file 29, the restaurant reservation system 5 regards the reservation as being cancelled, and deletes the reservation information from the reservation master file 33. The example of the reservation receipt Web page of FIG. 10 includes a column 1001 for a restaurant name, a column 1002 for a table number, a column 1003 for a table type, a column 1004 for indicating vacant or occupied, a column 1005 for a name, a column 1006 for an e-mail address, a column 1007 for the reserved number of persons, and a column 1008 for a usage purpose.

FIG. 11 shows an example of the Web page for the provisional reservation receipt. In the case of the provisional reservation, since the seat relative to the reservation is occupied at present, the page includes a display indicating that a restaurant invitation is transmitted by e-mail at the point of time when the estimated outgo time becomes definite. The example of the Web page for the provisional reservation receipt, shown in FIG. 11 includes a column 1100 for a restaurant name, a column 1101 for a table number, a column 1102 for a table type, a column 1103 for indicating vacant or occupied, a column 1104 for a name, a column 1105 for an e-mail address, a column 1106 for the reserved number of persons, a column 1107 for a usage purpose, and a column 1108 for acceptability of a change to another table. Incidentally, even in the provisional reservation, in the case where the customer does not come to the restaurant in, for example, a predetermined time after the notification of the restaurant invitation, the information of the provisional reservation is automatically deleted from the reservation master file 33.

In the manner as described above, the reservation person can make the reservation or the provisional reservation for the desired seat. Incidentally, the reservation processor 57 carries out the following processing in accordance with the reservation or the provisional reservation. That is, the reservation processor 57 judges whether or not this received instruction is the reservation (step S27: Yes route), and if it is the reservation, the reservation processor 57 activates the operation instructing processor 53 with the use of the seat number for the reservation, and parameters "reservation" and "reservation card" (step S29), and once terminates the processing. The processing of the operation instructing processor 53 will be described later. Whether or not it is the reservation can be judged on the basis of whether or not information relative to the usage status is already stored in the seat master file 29.

On the other hand, in the case where it is not the reservation but the provisional reservation (step S27: No route), the operation instructing processor 53 is activated with the seat number for the provisional reservation and the parameter "provisional reservation" (step S31). Then, the reservation processor 57 reads out the information of the accumulated usage amount of money and the number of persons of the seat for the provisional reservation from the column 503 of the usage status information of the seat master file 29, and calculates the accumulated usage amount of money per person. Besides, using the information of the type and the number of persons stored in the column 503 of the usage status information, the corresponding reference amount of money is read out from the reference amount table storage 31. Then, it is judged whether or not the accumulated usage amount of money per person of the seat subject to the provisional reservation is lower than the reference amount of money (step S33). In case the accumulated usage amount of money per person for the seat subject to the provisional reservation is lower than the reference amount of money (step S33: Yes route), the processing is once terminated. On the other hand, in the case where the accumulated usage amount of money per person for the seat subject to the provisional reservation is not lower than the reference amount of money (step S33: No route), the restaurant invitation processor 59 is activated with the seat number of the seat for the provisional reservation(step S35). The processing of the restaurant invitation processor 59 will be described later.

Next, the processing of the restaurant POS system 11 and the POS information processor 51 of the restaurant reservation system 5 will be described with reference to FIGS. 12 to 15. Incidentally, there is also such a configuration that the restaurant POS system 11 automatically transmits the order information or the like to the POS information processor 51 of the restaurant reservation system 5 each time the POS information or the like for the order information of the customer is generated, or there is also such a configuration that the POS information processor 51 makes a request to the restaurant POS system 11 at a predetermined period or the like, and the restaurant POS system 11 responds to it to transmit the POS information.

Figure 12:
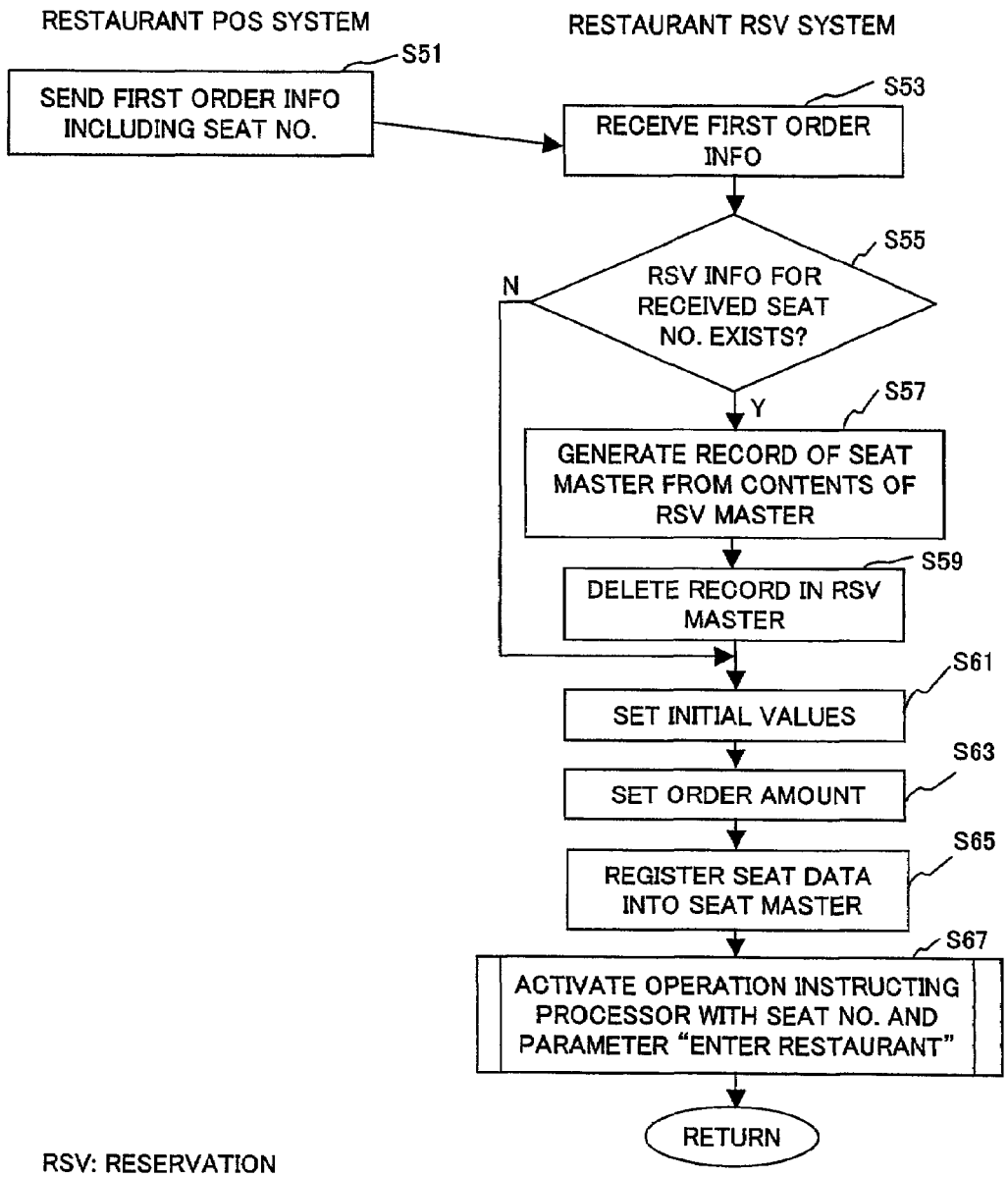
FIG. 12 is a flowchart showing an example of a first portion for a processing flow of a POS information processor.

The restaurant POS system 11 transmits first order information including the seat number to the POS information processor 51 automatically or in response to the request from the POS information processor 51 (FIG. 12: step S51). This first order information includes the order time, the seat number, the number of persons, the order items, the number of articles, and the like, and is based on, for example, information inputted from the handy terminal 17 in the restaurant. The POS information processor 51 receives the first order information from the restaurant POS system 11 (step S53), and stores it in the storage device. Then, the POS information processor searches the reservation master file 33 by using the seat number, and judges whether the reservation information is registered (step S55). In case the reservation information is registered, the contents registered in the reservation master file 33 are read out, and the record of the seat master file 29 is generated (step S57). In this embodiment, the reservation information of the reservation master file 33 is directly registered in the column 504 for the reservation information of the seat master file 29. Then, the record of the reservation master file 33 is deleted (step S59). On the other hand, in the case where the reservation information for the received seat number is not registered, the process proceeds to step S61.

Then, information such as the number of persons and the usage purpose (if it is included in the record of the reservation master file 33 or the order information), which are included in the received order information, the date, the type information based on the date, and the start time are set as initial values in the record (step S61). Besides, the usage amount of money obtained from the order items and the number of articles included in the order information is set in the record (step S63). If the usage amount of money is included in the order information, it is used as it is. Then, these record data are registered in the seat master file 29 (step S65). Besides, the operation instructing processor 53 is activated with the seat number and the parameter "enter restaurant" (step S67). The processing of the operation instructing processor 53 will be described later in detail. Incidentally, although there is a case where the accumulated usage amount of money per person exceeds the reference amount of money in the first order, since it is improper to transmit the restaurant invitation mail in response to that, it is not judged here whether the accumulated usage amount of money exceeds the reference amount of money.

Figure 13:
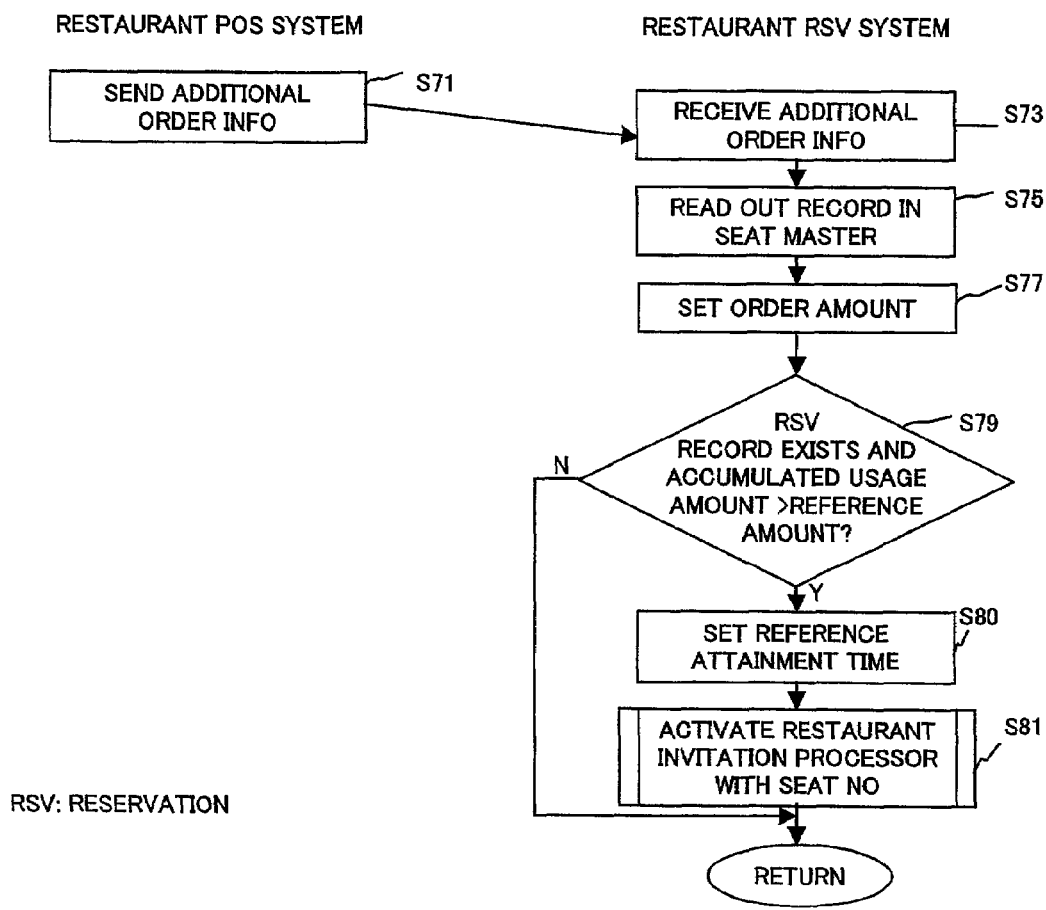
FIG. 13 is a flowchart showing an example of a second portion for a processing flow of the POS information processor.

The processing in the case where the customer gives an additional order will be described with reference to FIG. 13. The restaurant POS system 11 transmits the additional order information including the seat number to the POS information processor 51 automatically or in response to the request from the POS information processor 51 (step S71). The additional order information includes the order time, the seat number, the order items, the number of articles, and the like, and is based on, for example, the information inputted from the handy terminal 17 in the restaurant. Similarly to the initial order information, there is also a case where information of the order sum of money is also included. In response to that, the POS information processor 51 receives the additional order information from the restaurant POS system 11 and stores it in the storage device (step S73). Then, the POS information processor 51 searches the seat master file 29 by using the seat number, and reads out the record of the seat (step S75). Then, the POS information processor 57 adds the order sum of money of this additional order to the accumulated usage amount of money, sets a new accumulated usage amount of money to the read record of the seat (step S77), and registers it in the seat master file 29 again.

Next, the POS information processor 51 judges whether the reservation of the seat number relative to the additional order is registered in the reservation master file 33. In case the reservation of the seat number relative to the additional order is registered in the reservation master file 33, the accumulated usage amount of money per person is calculated from the accumulated usage amount of money and the number of persons of the seat that are registered in the seat master file 29. Then, the accumulated usage amount of money per person is compared with the reference amount of money read out from the reference amount table storage 31 using the type information of the seat registered in the seat master file 29, and it is judged whether or not "the accumulated usage amount of money per person>the reference amount of money" is satisfied (step S79). In case the reservation of the seat number relative to the additional order is not registered in the reservation master file 33, and in the case where the above relation is not satisfied, the process is returned to the original processing.

On the other hand, in the case where it is judged that the reservation of the seat number relative to the additional order is registered in the reservation master file 33, and the relation that the accumulated usage amount of money per person is larger than the reference amount of money is satisfied, as the reference attainment time when the accumulated usage amount of money per person reaches the reference amount of money, the time of the additional order is registered in the seat master file 29 (step S80). Next, the restaurant invitation processor 59 is activated with the seat number relative to the additional order (step S81). The detailed processing of the restaurant invitation processor 59 will be described later. Then, the POS information processor 51 returns to the original processing.

Figure 14:
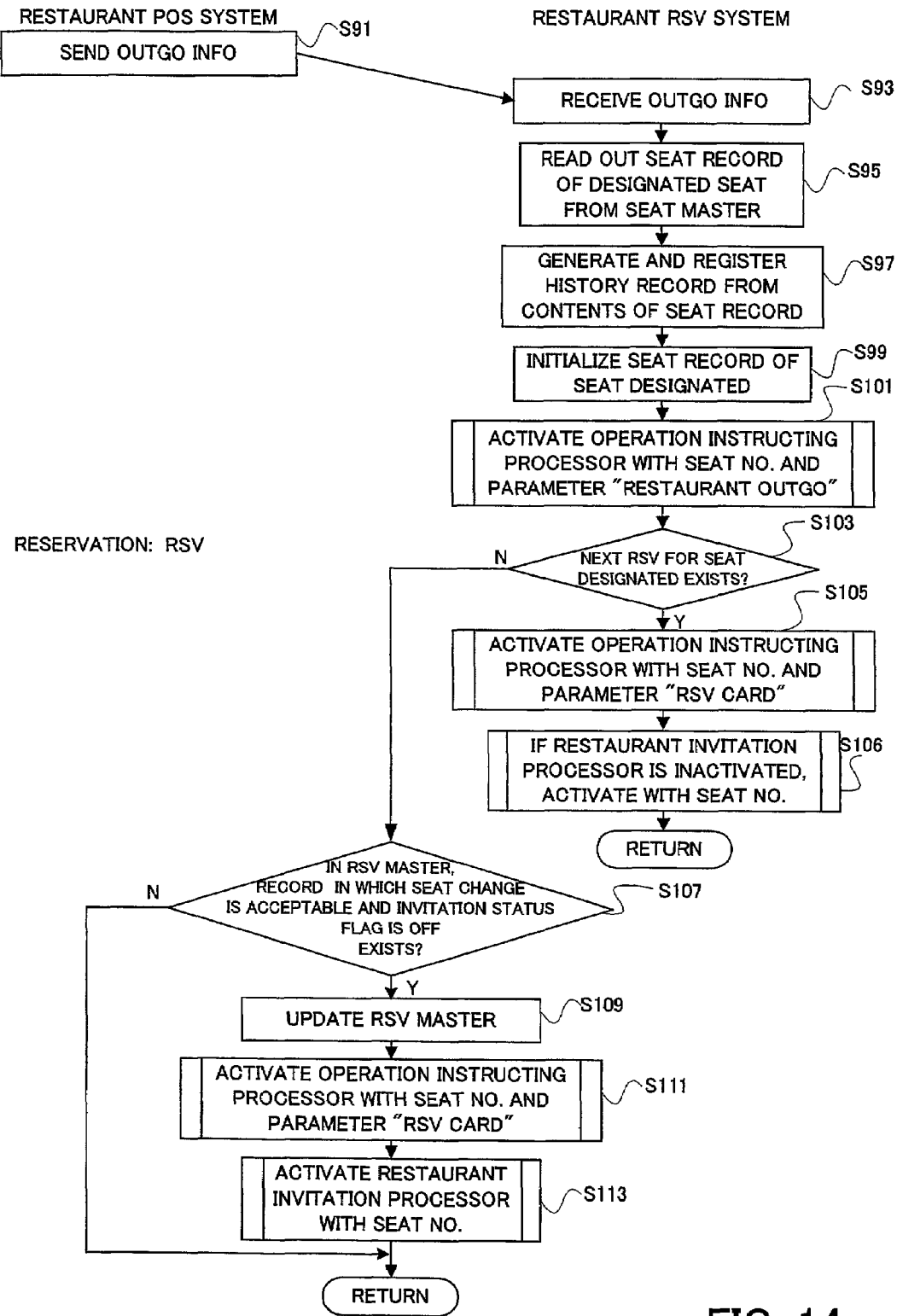
FIG. 14 is a flowchart showing an example of a third portion of a processing flow of the POS information processor.

Next, the processing in the case where for example, a customer pays the accumulated usage amount of money at the installation place of the POS register 15 and a waiter or waitress inputs information of the payment to the POS register 15, will be described with reference to FIG. 14. The restaurant POS system 11 transmits the restaurant outgo information including the seat number automatically or in response to the request from the POS information processor 51 to the POS information processor 51 (step S91). The restaurant outgo information includes the time information. In response to this, the POS information processor 51 receives the restaurant outgo information from the restaurant POS system 11, and stores it in the storage device (step S93). Then, the POS information processor reads out the seat record of the seat number included in the restaurant outgo information from the seat master file 29 (step S95), generates the history record from the contents of the seat record, and registers it in the usage history file 35 (step S97). Incidentally, at the time of generation of the history record, the outgo time is set as the end time.

FIG. 15 shows an example of the usage history file 35. The example of usage history file 15 shown in FIG. 15 includes a column 1501 for a key including a seat number, a date and a start time, a column 1502 for storing usage status information including the number of persons, a usage purpose, an accumulated usage amount of money, a reference attainment time, an end time, and the like, and a column 1503 for reservation information including a receipt date, a receipt time, a name, an e-mail address, the reserved number of persons, the number of males and females, a usage purpose, information as to whether or not a change is acceptable, and the like.

The POS information processor 51 initializes the seat record of the seat number relative to the restaurant outgo information in the seat master file 29 (step S99). The operation instructing processor 53 is activated with the seat number relative to the restaurant outgo information and the parameter "restaurant outgo" (step S101). Then, it is judged whether a next reservation of the seat number relative to the restaurant outgo information is registered in the reservation master file 33 (step S103). In case it is judged that the next reservation is registered in the reservation master file 33, the operation instructing processor 53 is activated with the seat number relative to the restaurant outgo and the parameter "reserved seat" (step S105). Whether or not the restaurant invitation processor 59 is inactivated is judged on the basis of whether or not the restaurant invitation status flag relative to the next reservation is set in the reservation master file 33, and in the case where the restaurant invitation is not sent, the restaurant invitation processor 59 is activated with the seat number relative to the restaurant outgo information (step S106). By this, even in the case where the customer goes out of the restaurant before the accumulated usage amount of money per person of the present customer exceeds the reference amount of money, the restaurant invitation mail can be transmitted to the reservation person. Then, the process is returned to the original processing.

On the other hand, at the step S103, in the case where it is judged that the next reservation of the seat number relative to the restaurant outgo information is not registered, it is judged whether, in the reservation master file 33, there is a reservation record in which a seat change is set to be acceptable and in which the restaurant invitation status flag indicates that the restaurant invitation processor 59 is not activated (step S107). Incidentally, if a similar seat type is not provided, there is also a case where it is improper to change the seat. Thus, a configuration may be such that it is also judged whether or not a similar seat type is provided. In case such a reservation record does not exist in the reservation master file 33, the process is returned to the original processing. In the case where such a reservation recode exists, the reservation record is updated in the reservation master file 33 so that the seat number of the reservation for the reservation is changed to the seat number relative to the restaurant outgo information (step S109). Then, the operation instructing processor 53 is activated with the seat number relative to the restaurant outgo information and the parameter "reservation card" (step S111). Besides, the restaurant invitation processor 59 is activated with the seat number relative to the restaurant outgo information (step S113). Then, the process is returned to the original processing.

By the foregoing processing of the restaurant POS system 11 and the POS information processor 51, it becomes possible to generate the record of the seat master file 29, to update the accumulated usage amount of money of the seat master file 29, and to judge whether or not the accumulated usage amount of money per person exceeds the reference amount of money, and in the case where it exceeds, the time when it exceeds, the outgo time and the like can be registered, and the operation instructing processor 53 and the restaurant invitation processor 59 can be activated.

Figure 16:
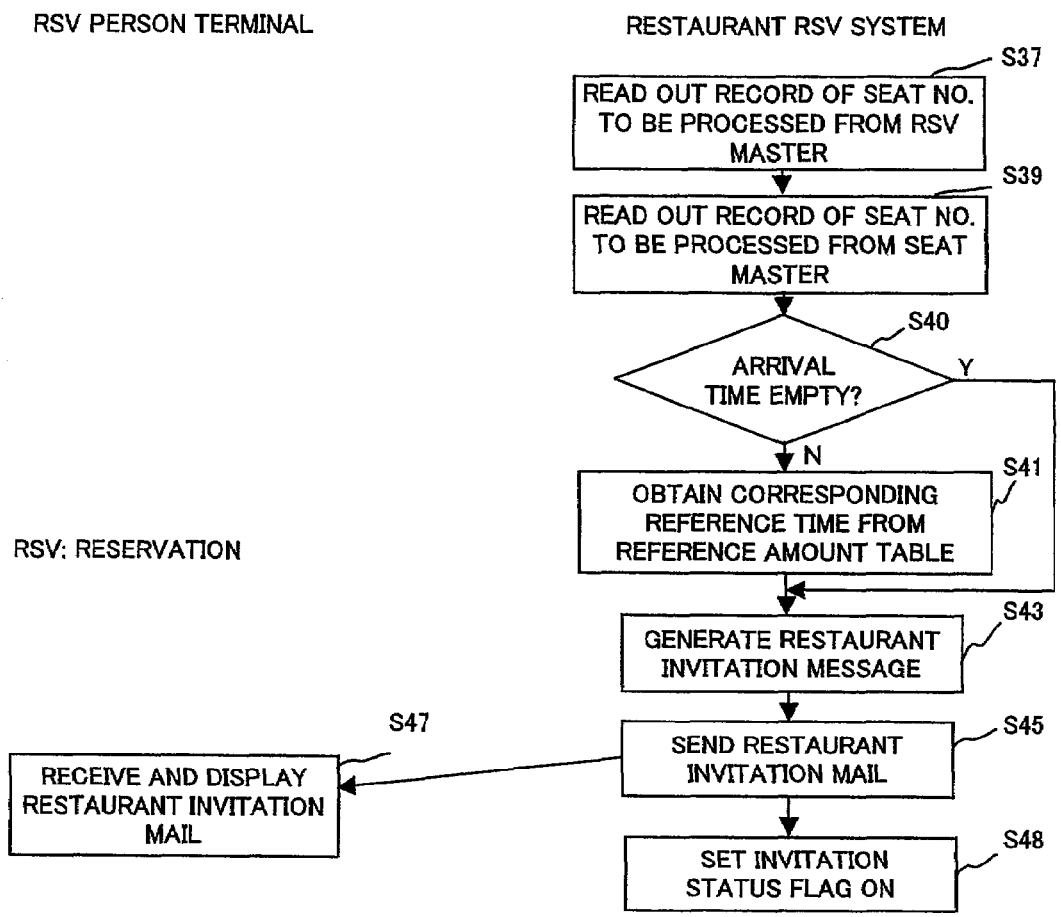
FIG. 16 is a flowchart showing an example of a processing flow of a restaurant invitation processor.

Next, the processing of the restaurant invitation processor 59 will be described with reference to FIG. 16. When being activated by the reservation processor 57 or the POS information processor 51, the restaurant invitation processor 59 of the restaurant reservation system 5 first reads out the record of the seat number to be processed from the reservation master file 33 (step S37). Then, the record of the seat number to be processed is read out from the seat master file 29 (step S39). In case the former customer goes out of the restaurant before the accumulated usage amount of money per person exceeds the reference amount of money, and in the case where the seat is changed, the start time (arrival time) of the seat number is not recorded in the seat master file 29. Accordingly, in order to judge whether the former use customer goes out of the restaurant before the accumulated usage amount of money per person exceeds the reference amount of money or the seat is changed, it is judged whether the start time (arrival time) is empty in the record of the seat number to be processed in the seat master file 29 (step S40).

In case the start time (arrival time) is included in the record of the seat number to be processed (step S40: No route), it is judged that the customer goes out of the restaurant after the accumulated usage amount of money exceeds the reference amount of money or the seat is not changed. Accordingly, the information of the reference time corresponding to the type information of the seat number to be processed in the seat master file 29 is obtained from the reference amount table of the reference amount table storage 31 (step S41). On the other hand, in the case where the arrival time is empty, the process proceeds to step S43. After the step S40 or the step S41, the restaurant invitation processor 59 generates the store invitation message (step S43). In the case where the customer goes out of the restaurant after the accumulated usage amount of money exceeds the reference amount of money or the seat is not changed, the restaurant invitation message includes the information of the estimated outgo time of the former customer. For example, if the reference attainment time relative to the seat number to be processed is 20:00, and the reference time is 30 minutes, 20:30 is obtained as the estimated outgo time of the former customer. Even if the provisional reservation is made after the reference attainment time, the same information can be used for the estimated outgo time. There is also a case where a time from the mail sending time is included in the restaurant invitation mail, instead of the estimated outgo time of the former customer. In that case, if the provisional reservation is made before the reference attainment time, the reference time is used as it is. On the other hand, in the case where the provisional reservation is made after the reference attainment time, the time of the difference between the estimated outgo time of the former customer and the present time is used.

The restaurant invitation processor 59 transmits the restaurant invitation mail including the generated restaurant invitation message to the e-mail address included in the reservation record of the seat number to be processed read out from the reservation master file 33 (step S45). On the other hand, the reservation person receives the restaurant invitation mail by using the reservation person terminal 3, and displays it on the display device (step S47). Although there is also a case where the reservation person terminal 3 is a terminal different from the terminal where the reservation has been made, any terminal may be used as long as the e-mail to the e-mail address registered at the reservation can be received.

FIG. 17 shows an example of the restaurant invitation mail. In the example of FIG. 17, in addition to a normal mail header, a message "Please come to our restaurant at 20:30" relative to the estimated outgo time of the former customer is included. This is a message for the provisional reservation, and if a message is concerned with the reservation where a seat is changed or a case where the accumulated usage amount of money per person of the former customer does not exceed the reference amount of money, the message becomes "Since the seat becomes vacant, please come to our restaurant.", and the estimated outgo time of the former customer is not included. Incidentally, in the case of the seat change, there is also a case where a message indicating such a message having the contents of "The seat is changed," for example, is included.

The restaurant invitation processor 59 sets the restaurant invitation status flag of the reservation record relative to the seat number to be processed in the reservation master file 33 (step S48). By this, the setting can be made so that the restaurant invitation mail relative to the same reservation is never transmitted.

By the restaurant invitation mail sent by the processing of the restaurant invitation processor 59, the reservation person can know the estimated outgo time of the former customer, and can prepare to go to the restaurant.

Figure 4:
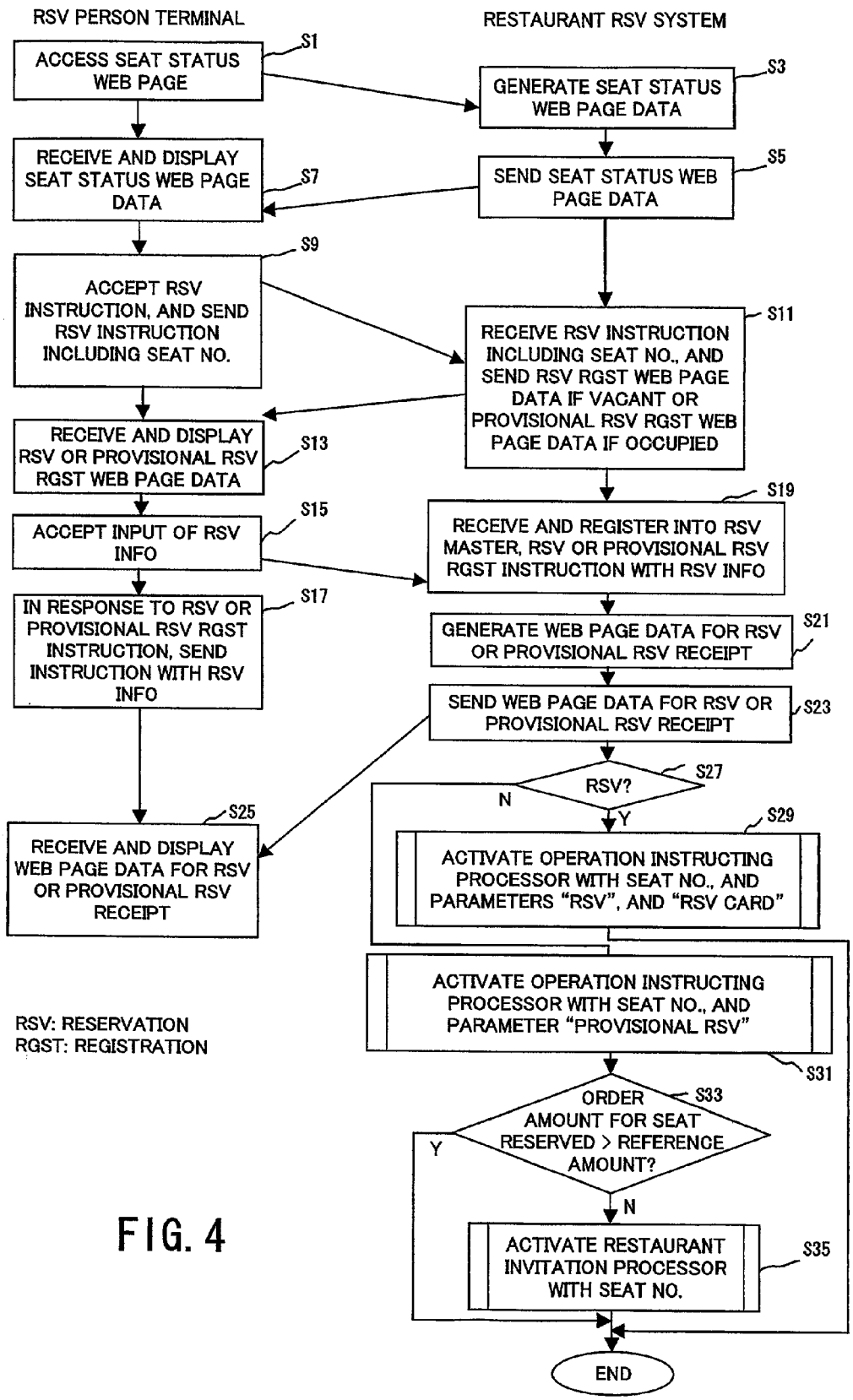
FIG. 4 is a flowchart showing a processing flow for seat status presentation and reservation.
Figure 18:
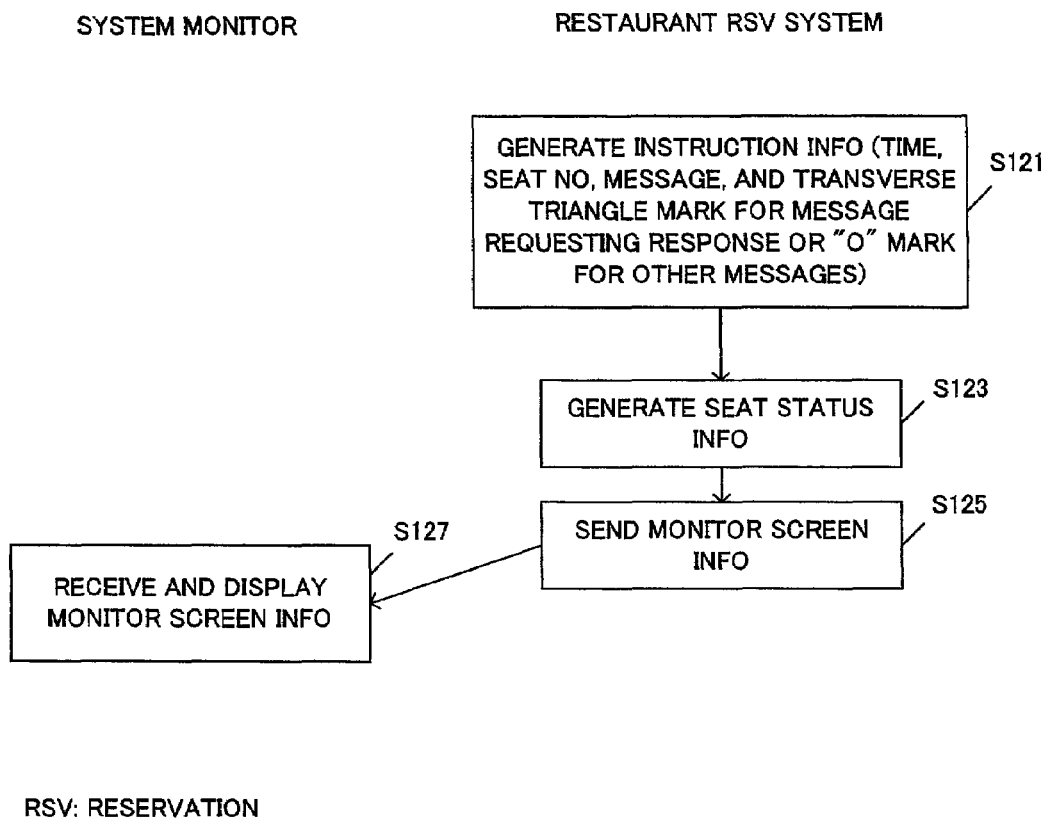
FIG. 18 is a flowchart showing an example of a first portion of a processing flow of an operation instructing processor.

Next, the processing of the system monitor 19 and the operation instructing processor 53 of the restaurant reservation system 5 will be described with reference to FIGS. 18 to 20. The operation instructing processor 53 is activated with the seat number and a predetermined parameter from the POS information processor 51 and the reservation processor 57. When being activated, the operation instructing processor 53 generates instruction information to be displayed on the system monitor (step S121). For example, a time, a seat number, a message, a transverse triangular mark in the case of a message requiring a response ("Make the seat reserved" corresponding to the parameter "reservation card"), and a ○ mark for a case other than that are set. Concerning the message, for example, "arrived" corresponds to a parameter "enter restaurant", "left" corresponds to a parameter "restaurant outgo", "reservation was received" corresponds to a parameter "reservation", "provisional reservation was received" corresponds to a parameter "provisional reservation", and "Make the seat reserved" corresponds to a parameter "reservation card". Then, the processing similar to the step S3 of FIG. 4 is executed, and seat status information is generated (step S121) Then, monitor screen information is transmitted to the system monitor 19 (step S125) The monitor screen information may be Web page data if the system monitor 19 is configured so as to execute the Web browser, and may be a bit map image if it has a configuration like thin client. Besides, if the system monitor 19 has another specific configuration, information for the specific configuration may be used. The system monitor 19 receives the monitor screen information from the operation instructing processor 53, and displays it (step S127).

FIG. 19 shows a display example of the system monitor 19. The example of FIG. 19 includes a seat status column 1901, an operation instruction column 1902, and a response button 1907, which is represented "Done". The seat status column 1901 is almost similar to the information presented for the reservation person in FIG. 7. The different points are that information of types of seats is not included in the seat status column 1901, and a reservation buttons are not included. These are unnecessary information for a waiter or waitress. However, such a configuration as contains these may be adopted. For example, if a reservation can be made from this screen, the waiter or waitress can make reservation registration to this system also with respect to a reservation by telephone or the like. The operation instruction column 1902 includes a column 1903 for a response symbol, a column 1904 for a time, a column 1905 for a seat number, and a column 1906 for a status and instruction for displaying a message. For example, the present line is "Make the seat reserved" issued at 19:30 and relative to the seat number 7. A waiter or waitress seeing this goes and puts "reservation card" on the seat number 7, and when the operation is completed, the response button 1907 is clicked.

Figure 20:
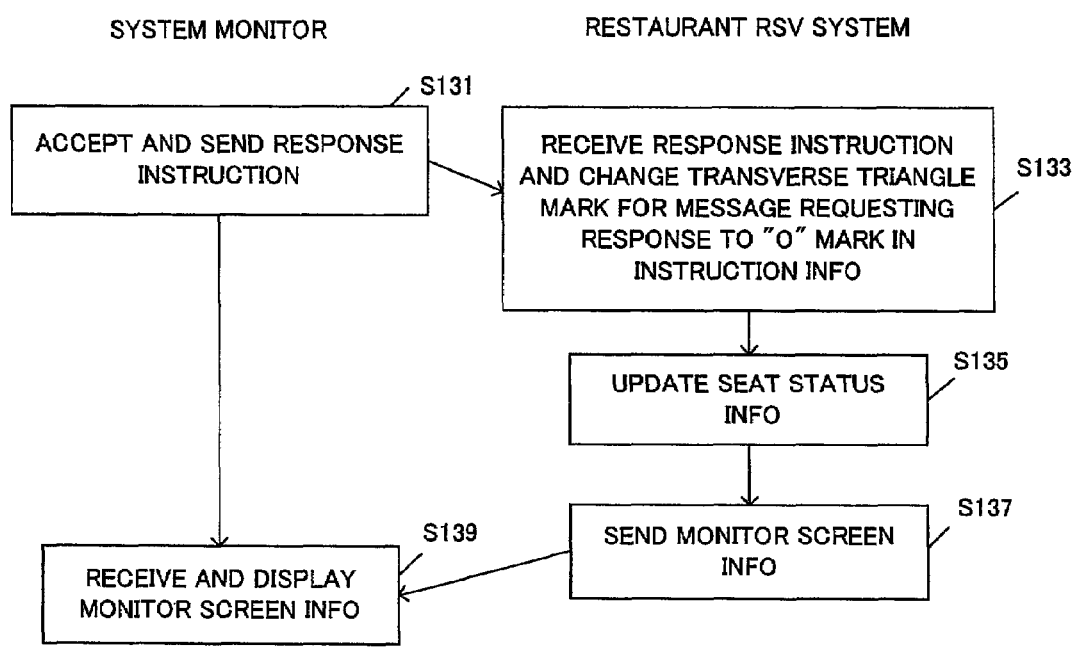
FIG. 20 is a flowchart showing an example of a second portion of a processing flow of the operation instructing processor.

FIG. 20 shows the processing in the case where this response button 1907 is clicked. When the waiter or waitress operating the system monitor 19 clicks the response button 1907, the system monitor 19 receives the response instruction by the click of the response button 1907, and transmits the response instruction to the operation instructing processor 53 (step S131). The operation instructing processor 53 receives the response instruction from the system monitor 19, and changes the transverse triangular mark of the message requiring the response in the instruction information to the ○ mark (step S133). Then, the operation instructing processor refers to the seat master file 29 and the reservation master file 33 to update the seat information (step S135), generates the monitor screen information, and transmits it to the system monitor 19 (step S137). The system monitor 19 receives the monitor screen information from the operation instructing processor 53 and displays it (step S139).

If doing so, the waiter or waitress of the restaurant can easily grasp the reservation status and the seat status, and can suitably perform the operation such as the setting of the reservation card.

Figure 21:
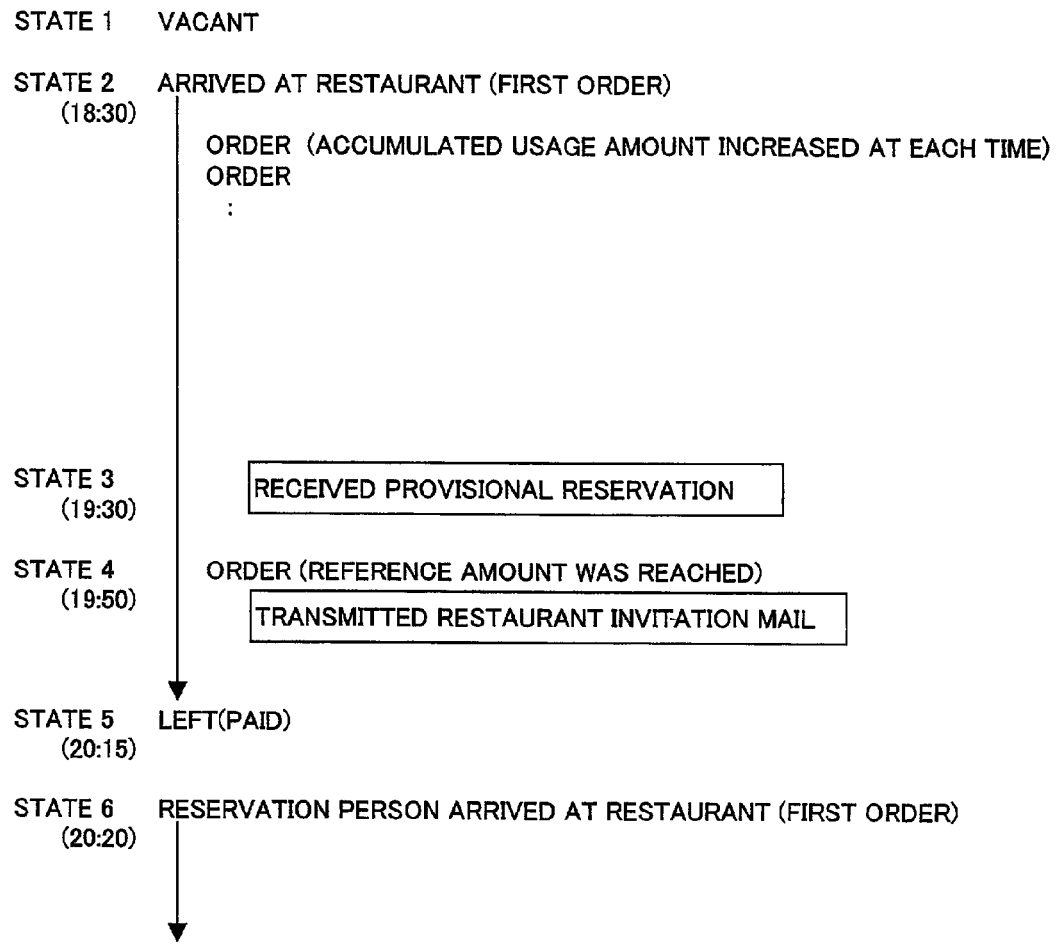
FIG. 21 is a diagram showing an example of a time chart for explaining data transition.

The specific time sequence relative to a specified seat will be described with reference to FIGS. 21 and 22. FIG. 21 shows a time chart of the seat number 4. FIG. 22 shows a data flow relative to the seat number 4. When viewing FIG. 21, the seat of the seat number 4 in a state 1 is vacant. However, a reservation was already made. As shown in FIG. 22, this is understood from the fact that the record of the seat number 4 in the seat master file 29 is empty, and the record of the seat number 4 of the reservation master file 33 exists. The reservation person was "Kinoshita" and made the reservation at 18:20. As shown in FIG. 21, the state is changed to a state 2 at 18:30. Here, the reservation person "Kinoshita" arrived at the restaurant, and gave the first order. As shown in FIG. 22, the record of the reservation master file 33 was transferred to the record of the seat number 4 in the seat master file 29, the arrival time (start time) was 18:30, the number of persons was four, and the accumulated usage amount of money was 500 yen. Incidentally, the reservation record stored in the reservation master file 33 was deleted. Thereafter, an additional order was given, and the accumulated usage amount of money increased at each time.

As shown in FIG. 21, the state was changed to a state 3 at 19:30. Here, the restaurant reservation system 5 received the provisional reservation. As shown in FIG. 22, the reservation person "Ito" made the provisional reservation at 19:30. At this time, the accumulated usage amount of money had already risen to 13420 yen. An additional order by the reservation person "Kinoshita" was further given, and as shown in FIG. 21, since the accumulated usage amount of money per person (=18140/4=4535 yen) reached the reference amount of money (for example, 4500 yen) by the order given at 19:50, the restaurant invitation mail was transmitted to the reservation person "Ito", and the state was changed to a state 4. As shown in FIG. 22, the reference attainment time was recorded as 1950.

As shown in FIG. 21, thereafter, the reservation person "Kinoshita" paid at 20:15 and left the restaurant. By this, the state was changed to a state 5. When the customer went out of the restaurant, as shown in FIG. 22, the record of the seat number 4 of the seat master file 29 was moved to the usage history file 35. The outgo time is also included in the record of the seat number 4 of the usage history file 35. The accumulated usage amount of money is also the final sum of money. As stated above, when data of the usage history file 35 is stored, the contents of the reference amount table can be updated to more suitable values. That is, the reference amount of money can be updated based on the accumulated usage amount of money, and the reference time can be updated by the difference between the reference attainment time and the end time.

Thereafter, when the reservation person "Ito" arrived at the restaurant in response to the restaurant invitation mail and gives the first order, the state was changed to a state 6. The time is 20:20. As shown in FIG. 22, the record of the seat number 4 of the reservation master file 33 was moved to the seat master file 29, and the arrival time, the number of persons, and the usage amount of money of the first order were set as initial values of the seat master file 29.

As shown in FIGS. 21 and 22, information of the seat and information of the reservation are changed, and are finally stored in the usage history file 35.

Although the embodiment of the present invention has been described, the present invention is not limited to this. For example, as shown in FIG. 3, there is also a case where the restaurant uses the ASP server 25. The ASP server 25 is provided with, for example, the function of the restaurant reservation system 5 and the storage device such as the seat master file 29, and the POS information is transmitted from, for example, the restaurant POS system 11 through, for example, the public network 27 or VPN (Virtual Private Network) to the ASP server 25. The reservation person operates the reservation person terminal 3 or the like to access the ASP server 25, and makes the reservation as described above. Besides, in the case of the provisional reservation, the restaurant invitation mail is transmitted from the ASP server 25. With respect to the system monitor 19, there is also a case where it is replaced by the restaurant terminal 21 connected to the ASP server 25 through the Internet 1. Besides, there is also a case where the function of the system monitor 19 is added to the POS register 15.

Figure 23:
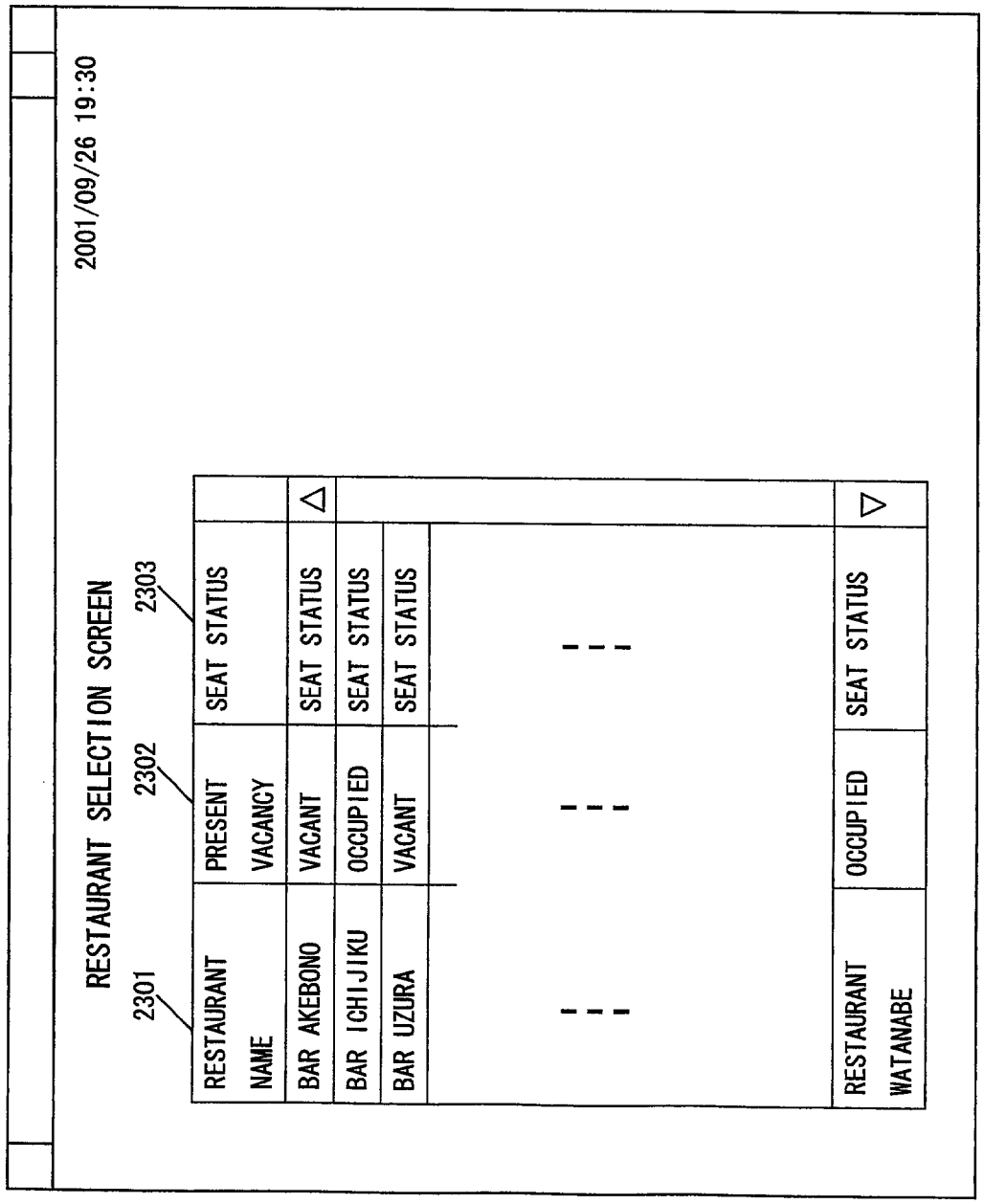
FIG. 23 is a diagram showing an example of a screen for restaurant selection.
Figure 24:
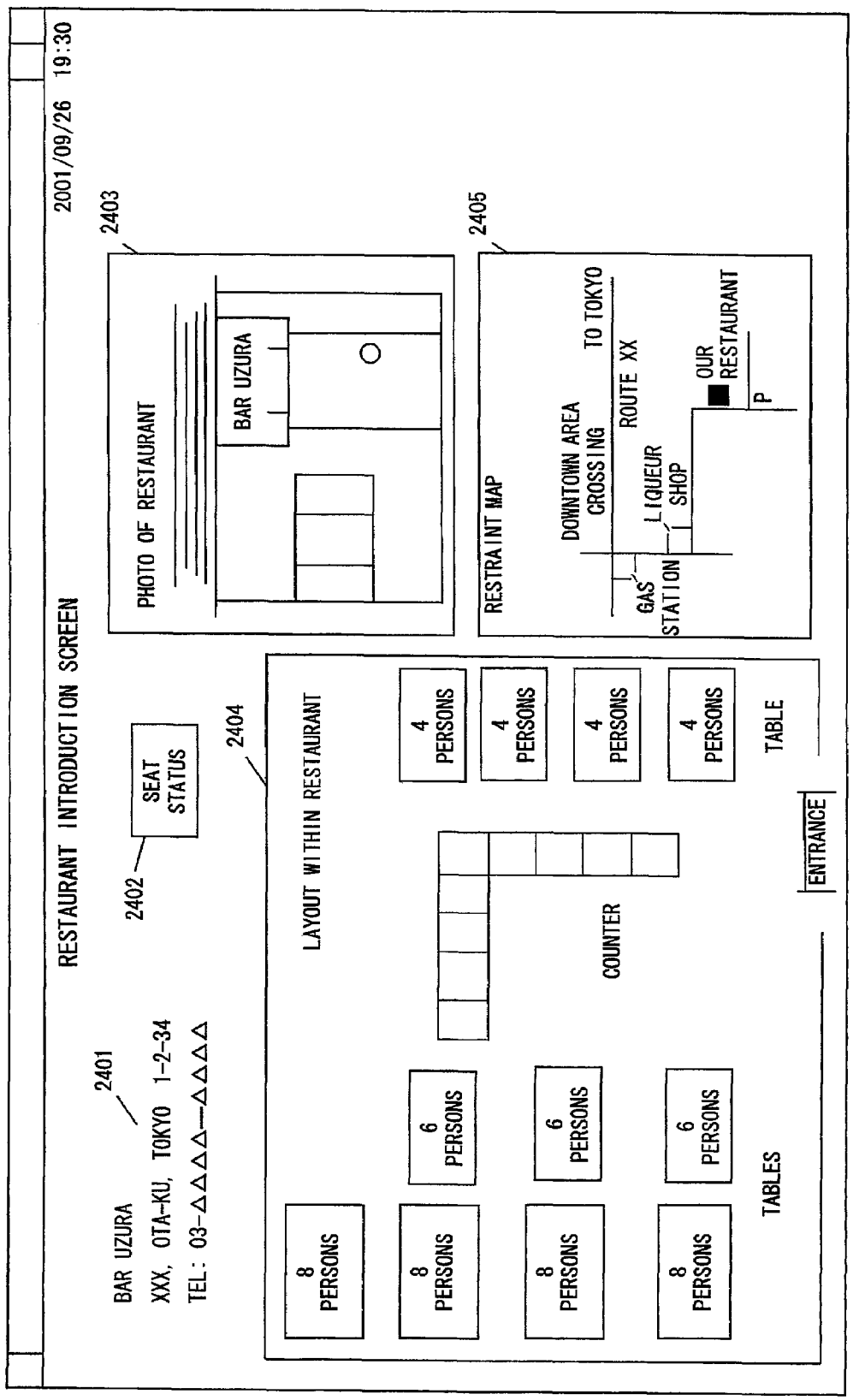
FIG. 24 is a diagram showing an example of a screen for restaurant introduction.

There is also a case where the service server 23 is installed. At this time, a plurality of restaurants are registered in the service server 23, and a configuration can also be adopted such that the reservation person selects a suitable restaurant from the plurality of restaurants through the service server 23, and then, jumps to the restaurant reservation system 5 of the suitable restaurant. For example, when accessing the service server 23, the Web page data as shown in FIG. 23 is transmitted from the service server 23 to the reservation person terminal 3. The Web page as shown in FIG. 23 includes a column 2301 of a selection button for a restaurant name, a column 2302 for indicating a present vacancy of the seats, and a column 2303 for a seat status button. In order to carry out a display relative to the present vacancy of the seats, the restaurant reservation system 5 of each restaurant must be provided with a processing element for periodically transmitting information of the existence of vacant seats to the service server 23. When the reservation person operates the reservation person terminal 3 and clicks the selection button of the restaurant name, Web page data as shown in FIG. 24 is transmitted from the service server 23. On the other hand, a link to the seat status provider 55 of the restaurant reservation system 5 is embedded in the seat status button, and when the seat status button is clicked by the reservation person, the Web page data as shown in FIG. 7 is transmitted from the restaurant reservation system 5.

FIG. 24 is a Web page of restaurant introduction. The example of FIG. 24 includes a basic information 2401 (name of restaurant, address and telephone number), a seat status button 2402 for displaying the Web page as shown in FIG. 7, a store photograph 2403, a layout 2404 within the restaurant, and an image 2405 of a restaurant map. In this way, the reservation person can know the outline of the restaurant.

Besides, there is also a case where the ASP server 25 has the function of the service server 23.

The restaurant reservation system 5, the service server 23 or the ASP server 25 may be realized by one computer, or may be realized by a plurality of computers. The manner of dividing the functional block in the restaurant reservation system 5 is arbitrary, and the example of FIG. 3 is merely one example.

In chain restaurants, a configuration may be such that one restaurant reservation system 5 is provided in the headquarter, and the system monitor 19 is provided for each of the restaurants.

Further, although the above description has been given of the example in which the accumulated usage amount of money per customer is compared with the reference amount of money, a configuration may be such that the accumulated usage amount of money is compared with the sum obtained by multiplying the reference amount of money by the number of persons.

As described above, according to the present invention, a technique for estimating an outgo time of a customer in a service providing store such as a restaurant can be provided.

Besides, a technique for effectively dealing with reservations in a service providing store such as a restaurant can also be provided.

Moreover, a technique for enabling a reservation without time designation in a service providing store such as a restaurant to be dealt with can also be provided.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An information processing method, comprising:
by obtaining information concerning a usage amount of money of a customer in a store, calculating an accumulated usage amount of money of said customer;
comparing said accumulated usage amount of money of said customer with a predetermined reference amount of money as to said accumulated usage amount of money;
upon detecting that said accumulated usage amount of money of said customer exceeds said predetermined reference amount of money, estimating an outgo time of said customer on the basis of a point in time when said accumulated usage amount of money of said customer exceeds said predetermined reference amount of money;
and transmitting data concerning said outgo time of said customer to a terminal of said store or a customer terminal.

2. The information processing method as set forth in claim 1, further comprising, upon detecting that a second customer makes a reservation without time designation for a reservation unit including a seat of said customer and it is determined that said accumulated usage amount of money of said customer exceeds said predetermined reference amount of money, notifying said second customer of the estimated outgo time of said customer.

3. The information processing method as set forth in claim 1, wherein said predetermined reference amount of money is set according to at least one of the number of customers and a category of a date.

4. The information processing method as set forth in claim 1, wherein said predetermined time corresponds to said predetermined reference amount of money and is set according to at least one of the number of customers and a category of a date.

5. The information processing method as set forth in claim 1, wherein said accumulated usage amount of money of said customer means an accumulated usage amount of money per customer.

6. The information processing method as set forth in claim 1, further comprising notifying a second customer who made a reservation for a reservation unit including a seat of said customer upon detecting that outgo information of said customer is obtained before said accumulated usage amount of money of said customer exceeds said predetermined reference amount of money.

7. The information processing method as set forth in claim 1, further comprising: upon detecting that outgo information of said customer is received, determining whether a reservation of a second customer is registered with regard to a reservation unit including a seat of said customer; and upon detecting that said reservation of said second customer is registered, transmitting an instruction concerning a reserved seat to a restaurant terminal.

8. The information processing method as set forth in claim 1, further comprising: upon detecting that a reservation unit including a seat of said customer is not registered when outgo information of said customer is received but said reservation by a second customer is registered as to another reservation unit, determining whether said reservation by said second customer can be changed to said reservation unit including said seat of said customer; and notifying said second customer upon detecting that said seat can be changed.

9. The information processing method as set forth in claim 1, further comprising transmitting information concerning a usage status of said customer to a terminal of a second customer upon detecting that a request for obtaining information concerning a store usage status is received from said second customer, said information concerning said usage status generated based on at least a comparison result of said comparing.

10. A program embodied on a medium for causing a computer to perform information processing, said program comprising:
by obtaining information concerning a usage amount of money of a customer in a store, calculating an accumulated usage amount of said customer;
comparing said accumulated usage amount of money of said customer with a predetermined reference amount of money as to said accumulated usage amount of money;
upon detecting that said accumulated usage amount of money of said customer exceeds said predetermined reference amount of money, estimating an outgo time of said customer on the basis of a point in time when said accumulated usage amount of money of said customer exceeds said predetermined reference amount of money;
and transmitting data concerning said outgo time of said customer to a terminal of said store or a customer terminal.

11. The program as set forth in claim 10, further comprising, upon detecting that a second customer makes a reservation without time designation for a reservation unit including a seat of said customer and it is determined that said accumulated usage amount of money of said customer exceeds said predetermined reference amount of money, notifying said second customer of the estimated outgo time of said customer.

12. The program as set forth in claim 10, wherein said predetermined reference amount of money is set according to at least one of the number of customers and a category of a date.

13. The program as set forth in claim 10, wherein said predetermined time corresponds to said predetermined reference amount of money and is set according to at least one of the number of customers and a category of a date.

14. The program as set forth in claim 10, wherein said accumulated usage amount of money of said customer means an accumulated usage amount of money per customer.

15. The program as set forth in claim 10, further comprising notifying a second customer who made a reservation for a reservation unit including a seat of said customer upon detecting that outgo information of said customer is obtained before said accumulated usage amount of money of said customer exceeds said predetermined reference amount of money.

16. The program as set forth in claim 10, further comprising: upon detecting that outgo information of said customer is received, determining whether a reservation of a second customer is registered with regard to a reservation unit including a seat of said customer; and upon detecting that said reservation of said second customer is registered, transmitting an instruction concerning a reserved seat to a restaurant terminal.

17. The program as set forth in claim 10, further comprising: upon detecting that a reservation unit including a seat of said customer is not registered when outgo information of said customer is received but said reservation by a second customer is registered as to another reservation unit, determining whether said reservation by said second customer can be changed to said reservation unit including said seat of said customer; and notifying said second customer upon detecting that said seat can be changed.

18. The program as set forth in claim 10, further comprising transmitting information concerning a usage status of said customer to a terminal of a second customer upon detecting that a request for obtaining information concerning a store usage status is received from said second customer, said information concerning said usage status generated based on at least a comparison result of said comparing.

19. An information processing apparatus, comprising:
means for calculating an accumulated usage amount of money of a customer by obtaining information concerning a usage amount of money of said customer in a store;
means for comparing said accumulated usage amount of money of said customer with a predetermined reference amount of money as to said accumulated usage amount of money;
upon detecting that said accumulated usage amount of money of said customer exceeds said predetermined reference amount of money, means for estimating an outgo time of said customer on the basis of a point in time when said accumulated usage amount of money of said customer exceeds said predetermined reference amount of money;
and means for transmitting data concerning said outgo time of said customer to a terminal of said store or a customer terminal.

20. The information processing apparatus as set forth in claim 19, further comprising means for, upon detecting that a second customer makes a reservation without time designation for a reservation unit including a seat of said customer and it is determined that said accumulated usage amount of money of said customer exceeds said predetermined reference amount of money, notifying said second customer of the estimated outgo time of said customer.

21. The information processing apparatus as set forth in claim 19, wherein said predetermined reference amount of money is set according to at least one of the number of customers and a category of a date.

22. The information processing apparatus as set forth in claim 19, wherein said predetermined time corresponds to said predetermined reference amount of money and is set according to at least one of the number of customers and a category of a date.

23. The information processing apparatus as set forth in claim 19, wherein said accumulated usage amount of money of said customer means an accumulated usage amount of money per customer.

24. The information processing apparatus as set forth in claim 19, further comprising means for notifying a second customer who made a reservation for a reservation unit including a seat of said customer upon detecting that outgo information of said customer is obtained before said accumulated usage amount of money of said customer exceeds said predetermined reference amount of money.

25. The information processing apparatus as set forth in claim 19, further comprising:
   means for determining whether reservation of a second customer is registered with regard to a reservation unit including a seat of said customer upon detecting that outgo information of said customer is received; and
   means for transmitting an instruction concerning a reserved seat to a restaurant terminal upon detecting that said reservation of said second customer is registered.

26. The information processing apparatus as set forth in claim 19, further comprising:
   means for, upon detecting that a reservation as to a reservation unit including a seat of said customer is not registered when outgo information of said customer is received but said reservation by a second customer is registered as to another reservation unit, determining whether said reservation by said second customer can be changed to said reservation unit including said seat of said customer; and means for notifying said second customer upon detecting that said seat can be changed.

27. The information processing apparatus as set forth in claim 19, further comprising means for transmitting information concerning a usage status of said customer to a terminal of a second customer upon detecting that a request for obtaining information concerning a store usage status is received from said second customer, said information concerning said usage status generated based on at least a comparison result of said means for comparing.

* * * * *

UNITED STATES PATENT AND TRADEMARK OFFICE
CERTIFICATE OF CORRECTION

PATENT NO. : 7,136,822 B2 Page 1 of 1
APPLICATION NO. : 10/083111
DATED : November 14, 2006
INVENTOR(S) : Maki Kimura et al.

It is certified that error appears in the above-identified patent and that said Letters Patent is hereby corrected as shown below:

Title Page, Column 2 item 56 (Other Publications), Line 1, change "et al," to --et al.,--.

Title Page, Column 2 item 56 (Other publications), Line 4, change "et al," to --et al.,--.

Title Page Column 2 (Assistant Examiner), Line 1, change "Sallard" to --Saliard--.

Signed and Sealed this

Eighth Day of May, 2007

JON W. DUDAS
*Director of the United States Patent and Trademark Office*